(12) United States Patent
Lo et al.

(10) Patent No.: US 7,313,561 B2
(45) Date of Patent: Dec. 25, 2007

(54) MODEL DEFINITION SCHEMA

(75) Inventors: Alvin Lo, Bellevue, WA (US); Adam Yeh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 10/727,176

(22) Filed: Dec. 3, 2003

(65) Prior Publication Data

US 2004/0181538 A1 Sep. 16, 2004

Related U.S. Application Data

(63) Continuation-in-part of application No. 10/386,633, filed on Mar. 12, 2003, now Pat. No. 7,275,024.

(51) Int. Cl.
*G06F 17/30* (2006.01)

(52) U.S. Cl. .............. 707/100; 707/103 R; 707/103 Y; 707/102; 707/104.1

(58) Field of Classification Search ................ 707/100, 707/102, 103 R
See application file for complete search history.

(56) References Cited

U.S. PATENT DOCUMENTS

| | | | | |
|---|---|---|---|---|
| 5,499,371 | A | 3/1996 | Henninger et al. | 395/700 |
| 6,101,502 | A | 8/2000 | Heubner et al. | 707/103 |
| 6,212,524 | B1 * | 4/2001 | Weissman et al. | 707/101 |
| 6,354,689 | B1 | 3/2002 | Couwenhoven et al. | |
| 6,360,223 | B1 | 3/2002 | Ng et al. | 707/100 |
| 6,609,123 | B1 | 8/2003 | Cazemier et al. | 707/4 |
| 6,665,644 | B1 | 12/2003 | Kanevsky et al. | 704/275 |
| 6,807,518 | B1 | 10/2004 | Lang | 703/2 |
| 6,862,574 | B1 | 3/2005 | Srikant et al. | 705/10 |
| 6,907,433 | B2 * | 6/2005 | Wang et al. | 707/104.1 |
| 6,964,023 | B2 | 11/2005 | Maes et al. | 715/811 |
| 6,980,980 | B1 | 12/2005 | Yeh | 707/2 |
| 7,007,029 | B1 | 2/2006 | Chen | 707/100 |
| 7,111,010 | B2 | 9/2006 | Chen | 707/102 |
| 7,185,016 | B1 | 2/2007 | Rasmussen | 707/100 |
| 2002/0060707 | A1 | 5/2002 | Yu et al. | |
| 2002/0070953 | A1 | 6/2002 | Barg et al. | 345/700 |
| 2002/0087516 | A1 * | 7/2002 | Cras et al. | 707/2 |
| 2002/0147848 | A1 | 10/2002 | Burgin et al. | 709/246 |
| 2003/0120593 | A1 | 6/2003 | Bansal et al. | 705/39 |

(Continued)

FOREIGN PATENT DOCUMENTS

EP 863004 A2 9/1998

(Continued)

OTHER PUBLICATIONS

XML.com, "Mapping DTDs to Databases," http://www.xml.com/lpt/a/2001/05/09/dtdtodbs.html, May 19, 2001.

(Continued)

*Primary Examiner*—Cam Y T Truong
(74) *Attorney, Agent, or Firm*—Westman, Champlin & Kelly, P.A.

(57) ABSTRACT

A tagged format data schema is disclosed. The schema enables an object-relational model to be specified and decorated with metadata so that a dimensional model can be inferred therefrom. In accordance with one embodiment, based on information specified in the schema, a processing engine is able to autonomously generate a dimensional model.

23 Claims, 25 Drawing Sheets

U.S. PATENT DOCUMENTS

| | | | |
|---|---|---|---|
| 2003/0187756 A1 | 10/2003 | Klivington et al. | 705/27 |
| 2004/0181502 A1 | 9/2004 | Yeh et al. | 707/1 |
| 2004/0215626 A1* | 10/2004 | Colossi et al. | 707/100 |
| 2005/0038780 A1* | 2/2005 | de Souza et al. | 707/3 |
| 2005/0120021 A1 | 6/2005 | Tang et al. | 707/10 |
| 2005/0246370 A1* | 11/2005 | Rubendall | 707/103 R |

FOREIGN PATENT DOCUMENTS

| | | |
|---|---|---|
| EP | 974467 A1 | 1/2000 |
| EP | 983855 A2 | 3/2000 |
| EP | 1157840 A2 | 11/2001 |
| WO | WO 98/40222 A1 | 9/1998 |
| WO | WO 99/08875 A1 | 2/1999 |

OTHER PUBLICATIONS

XML.com, "RAX: An XML Database API," http://www.xml.com/lpt/a/2000/04/26/rax/index.html, Apr. 26, 2000.

HiTSoftware, "Unifying XML and Relational Database Application Development," Jan. 2003, pp. 1-10.

Braganholo, et al., "On the Updatability of XML Views Over Relational Databases," International Workshop on the Web and Databases (WebDB), Jun. 12-13, 2003, San Diego, California.

Meng, et al., "OrientStore: A Schema Based Native XML Storage System," 29th VLDB Conference, Berlin, German 2003.

Barrett, Alexandra, "Databases Embrace XML," SW Expert, Aug. 2001, pp. 43-47.

Coox, S.V., "Axiomatization of the Evolution of XML Database Schema," Programming Computer Software, vol. 29, No. 3, 2003, pp. 1-7, Jan. 29, 2003.

Hahsler, Dr. Michael. "Knowledge Management Data Warehouses and Data Mining," Department of Information Processing, Vienna University of Economics and BA, Dec. 11, 2001, pp. 2-29.

Office Action for U.S. Appl. No. 10/386,633, filed Mar. 12, 2003.

Gopalkrishnan et al. "Issues of Object-Relational View Design in Data Warehousing Environment," IEEE 0-7803-4778-1/98, IEEE 1998.

Gopalkrishnan et al. "Star/Snow-flak Schema Driven Object-Relational Data Warehouse and Query Processing Strategies," DaWak '99, LNCS, 1999.

Phipps et al.; "Automating Data Warehouse Conceptual Schema Design and Evaluation," DMDW'02 Canada.

"A survey of approaches to automatic schema matching", Ram et al. The VLDB Journal 10:334-350, Feb. 2001.

European Search Report, US 6,360,223 Mar. 19, 2002.

* cited by examiner

FIG. 10

IBICodeGenerator

It is the primary interface for Code generation.

```
interface IBICodeGenerator
{
        void Generate(IConnection connection,
                ICube cube,
                string nameSpace);
}
```

TODO include ICube and IConnection interfaces

```
        public static DataSet GetFlattenedData(BICriteria criteria)
        {
        }
}
```

FIG. 13

```
public class BICriteria
{
        public BICriteria(BIContext context, CalculatedMemberList calculatedMemberList,
                AxisList axisList, Where where)
        {
        } public BICriteria(BIContext context, AxisList axisList, Where where)
        {
        } public BICriteria(BIContext context, CalculatedMemberList calculatedMemberList,
                AxisList axisList)
        {
        } public BICriteria(BIContext context, AxisList axisList)
        {
        } public static BIContext BIContext(params Type[] types)
        {
        } public static Where Where(params string[] sliceVals)
        {
        } public static Where Where(params Member[] members)
        {
        } public static Axis Axis(params Set[] sets)
        {
        } public static AxisList AxisList(params Axis[] axisList)
        {
        } public static AxisList AxisList(params Set[] sets)
        {
        } public static Set Set(params string[] vals)
        {
        } public static Set Set(params Member[] members)
        {
        } public static Set Set(params Tuple[] tuples)
        {
        } public static CalculatedMemberList CalculatedMemberList(params CalculatedMember[] calculatedMembers)
        {
        } public static CalculatedMemberList CalculatedMemberList(Member calculatedMember, ArithmeticExpression expression)
        {
        }
}
```

MODEL DEFINITION SCHEMA

The present application is a Continuation-in-Part of and claims priority of U.S. patent application Ser. No. 10/386,633, entitled "AUTOMATIC GENERATION OF A DIMENSIONAL MODEL FOR BUSINESS ANALYTICS FROM AN OBJECT MODEL FOR ONLINE TRANSACTIONI PROCESSING", filed Mar. 12, 2003 now U.S. Pat. No. 7,275,024, the content of which is hereby incorporated by reference in its entirety.

BACKGROUND OF THE INVENTION

The present invention generally deals with a data schema for describing object-relational model information. More specifically, the present invention pertains to a tagged format data schema that enables an object-relational model to be specified and decorated with metadata so that a dimensional model can be inferred from therefrom.

When designing software applications involving business transactions, application developers conventionally use a model driven architecture and focus on domain specific knowledge. The model driven architecture often includes business objects (or business entities) involved in the business transactions, such as business entities corresponding to customers, orders and products. These entities are modeled as objects following the paradigm of object orientation.

Each object encapsulates data and behavior of the business entity. For example, a Customer object contains data such as name, address and other personal information for a customer. The Customer object also contains programming code, for example, to create a new Customer, modify the data of an existing Customer and save the Customer to a database.

The object model also enables a description of relationships among the business entities modeled. For example, a number of Order objects can be associated with a Customer object representing the customer who makes those orders. This is known as an association relationship. Other types of relationships can also be described, such as compositions. An Order, for example, can be "composed of" a collection of OrderLines. These OrderLines do not exist independently of the Order they belong to. In this way, application developers convert the business logic associated with their applications to a set of models. Applications are built that implement this business logic, often using on-line transaction processing (OLTP).

Objects in an object model typically store their data in a relational database. To satisfy traditional reporting requirements, data is retrieved through the relational database using extraction, transformation and loading (ETL) processes. Data is retrieved, using these processes, into a staging area known as a data mart.

Currently, there is a knowledge gap between users who work on data marts and those who perform OLTP application development. Those who work on data marts do not normally have knowledge about how the object model is constructed. Therefore, when the data is retrieved through the ETL processes, the business logic (such as the relationships and classes, etc.) that was built into the object model is lost.

Traditionally, therefore, in order to facilitate user's reporting requirements, another model known as a dimensional model is built from the data in the data mart. The dimensional model includes a Fact table, that has measures, and associated tables, that are referred to as dimensions. Once the dimensional model is built, a user can specify a query against the dimensional model to obtain data in a somewhat logical fashion, even through the business logic built into the object model was lost.

This type of system, however, requires that a great deal of time be spent in reconstructing the business logic (or at least part of the business logic) to obtain the dimensional model. This can require companies that use such systems to maintain two groups of programmers, one to develop the business logic and implement it in an object model, and another to support the reporting structure required by the company. Of course, this duplication of personnel is both costly and inefficient.

SUMMARY OF THE INVENTION

The present invention generally deals with a data schema. Specific embodiments pertain to a tagged format data schema that enables an object-relational model to be specified and decorated with metadata so that a dimensional model can be inferred therefrom. In accordance with one embodiment, based on information specified in the schema, a processing engine is able to autonomously generate a dimensional model.

BRIEF DESCRIPTION OF THE DRAWINGS

FIG. 10 illustrates one embodiment of an example query to a dimensional model and corresponding result set.

FIG. 13 illustrates one exemplary interface for invoking functionality of a business intelligence entity generator.

FIG. 15 illustrates one exemplary embodiment of an interface to a BI criteria component.

FIG. 18 illustrates one exemplary result set.

Appendix A is an example of an XML focal point specification file.

Appendix B is an example of a mapping file.

Appendix C is an example of pseudo code illustrating the operation of the model services system.

Appendix D illustrates the interfaces supported by components of the model services system and the business intelligence entity generator.

DETAILED DESCRIPTION OF ILLUSTRATIVE EMBODIMENTS

Various aspects of the present invention deal with a data schema that enables an object-relational model to be specified and decorated with metadata so that a dimensional model can be inferred therefrom. However, prior to describing the present invention in greater detail, one embodiment of an illustrative environment in which the present invention can be used will be described.

Figure 1:
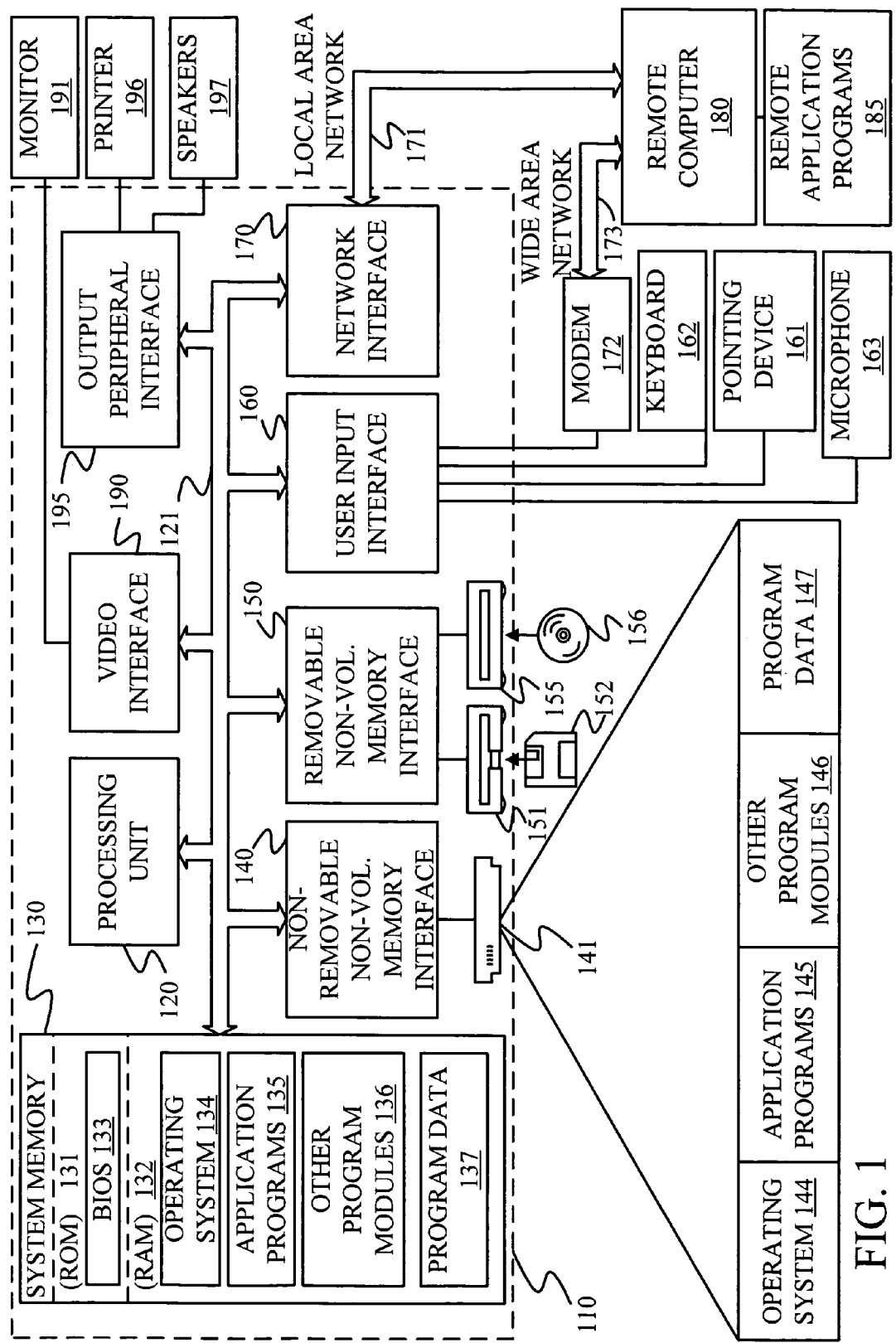
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
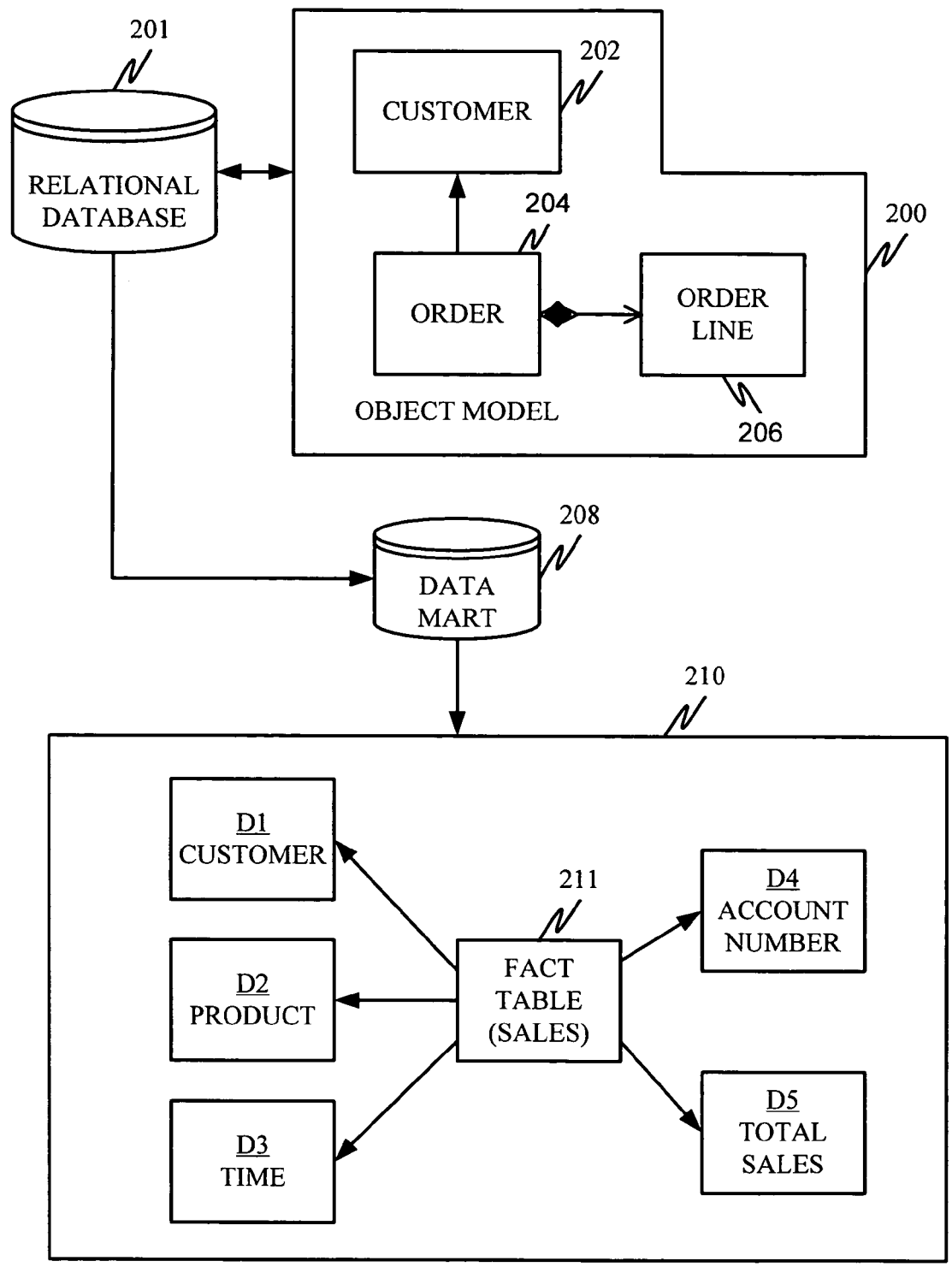
FIG. 2 illustrates a prior art system for implementing business logic and a reporting structure.

FIG. 2 is a block diagram illustrating data processing in accordance with the prior art. FIG. 2 illustrates that an application developer has implemented business logic used by an application by developing object model 200. As shown in FIG. 2, object model 200 includes a plurality of different business entities, including a Customer entity 202, an Order entity 204 and an OrderLine entity 206. The object model 200 uses notation which is commonly known as unified modeling language (UML). The notation shows a composition relationship between Order 204 and OrderLine 206. Thus, it indicates that the Order entity 204 is composed of one or more OrderLine entities 206. Object model 200 also shows that Order 204 has an association with Customer 200.

In prior systems, in order to support a desired reporting structure, data was first retrieved from a persistent data store (such as a relational database) 201 using extraction, transformation, and loading (ETL) processes and placed in a data mart 208 which acted as a staging area for the data prior to retrieving it.

Then, developers supporting the reporting structure for the user generated a dimensional model, such as model 210. The dimensional model typically includes a Fact table 212 which has measures noted therein. The Fact table 210 also has a plurality of dimensions illustrated as D1-D5 in FIG. 2. The dimensional model 210 was typically created based on the particular features in the data that the user desired to report on and analyze. Thus, some of the business logic implemented in object model 200 was recreated in dimensional model 210.

However, typically, the application developers that implement business logic through object models are different, and have a different knowledge base, than those who develop dimensional models. Therefore, a great deal of time and effort has traditionally been spent in reconstructing at least a part of the business logic implemented through object model 200 in obtaining a dimensional model 210 which can be used for reporting.

Another difficulty associated with some prior art techniques is that even to generate reports from dimensional model 210 required the report generator to be familiar with multi-dimensional expressions (MDX). MDX can be difficult to learn because it has a complex syntax, and it is different than the object oriented expressions required to create and interact with object model 200. Therefore, even after dimensional model 210 was constructed, generating reports has still required personnel with specialized knowledge, other than that used in object oriented programming.

Figure 3:
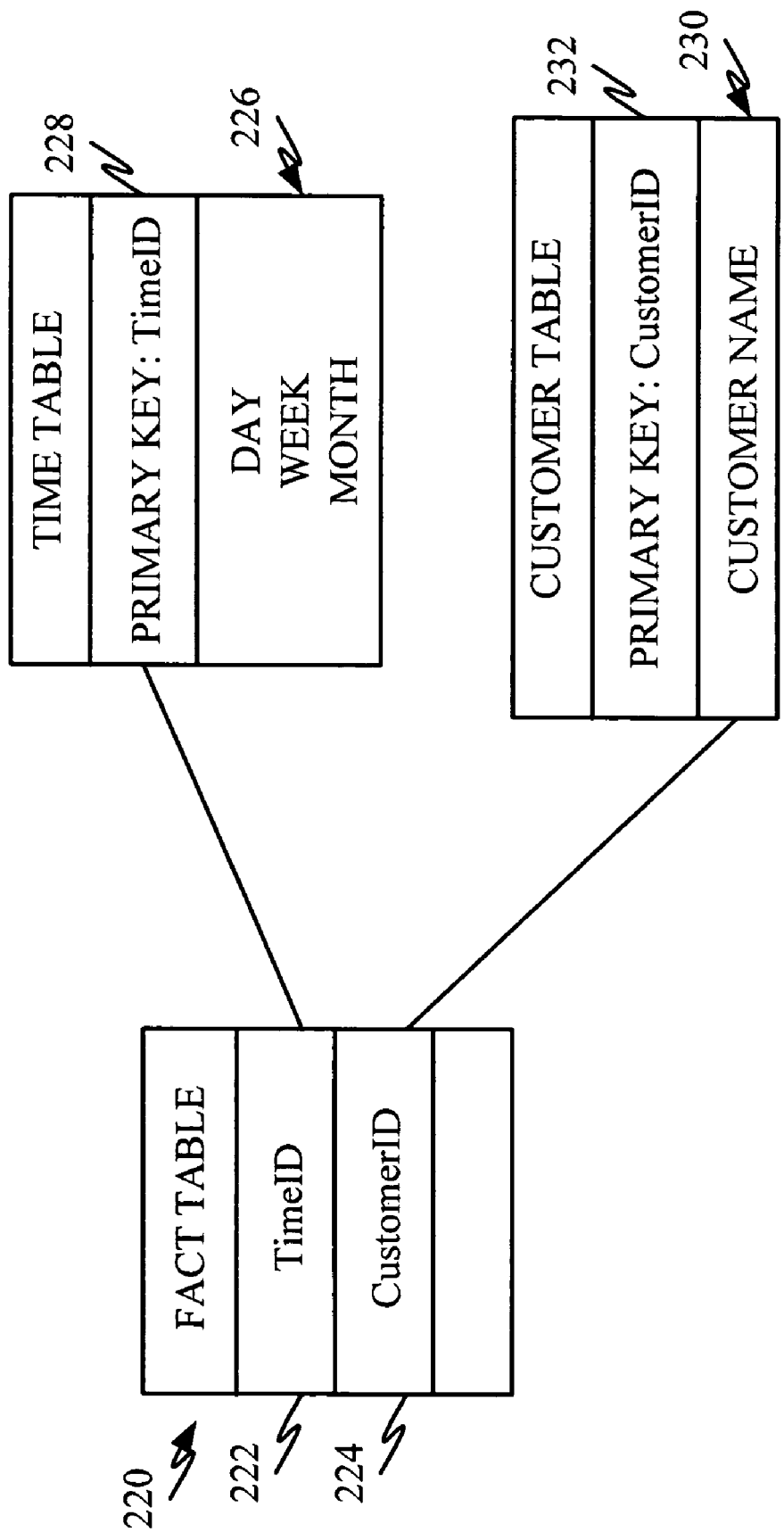
FIG. 3 is an example of a dimensional model illustrating a foreign key relationship.

Prior to describing the invention in greater detail, the concept of foreign key relationships will be discussed. FIG. 3 is a simplified diagram illustrating the concept of a foreign key relationship. FIG. 3 shows that a Fact table 220 includes other tables associated with "time" and "customer" as dimensions. Therefore, Fact table 220 includes a TimeID field 222 and a CustomerID field 224.

The Time table 226 includes a primary key referred to as TimeID in field 228. The primary key uniquely identifies a record in the Time table 226. Time table 226 also contains a number of additional fields related to time, such as day, week and month.

Customer table 230 also includes a primary key field that contains a primary key referred to as CustomerID 232. The primary key of the Customer table uniquely identifies a record in the Customer table. Of course, the Customer table also includes additional items associated with the customer, such as customer name.

Therefore, the primary key in a table is a unique identifier for the records in that table. However, the TimeID field 222 and CustomerID field 224 in Fact table 220 are identifiers which refer to other tables (in this case 226 and 230, respectively). Therefore, the keys contained in fields 222 and 224 in Fact table 220 are foreign keys. Some complexity arises with respect to foreign key relationships. For example, a table cannot be deleted if its primary key is a foreign key in another table, without dealing with the foreign key relationship. Otherwise, such a deletion breaks the integrity constraints typically imposed on such systems.

Figure 4A:
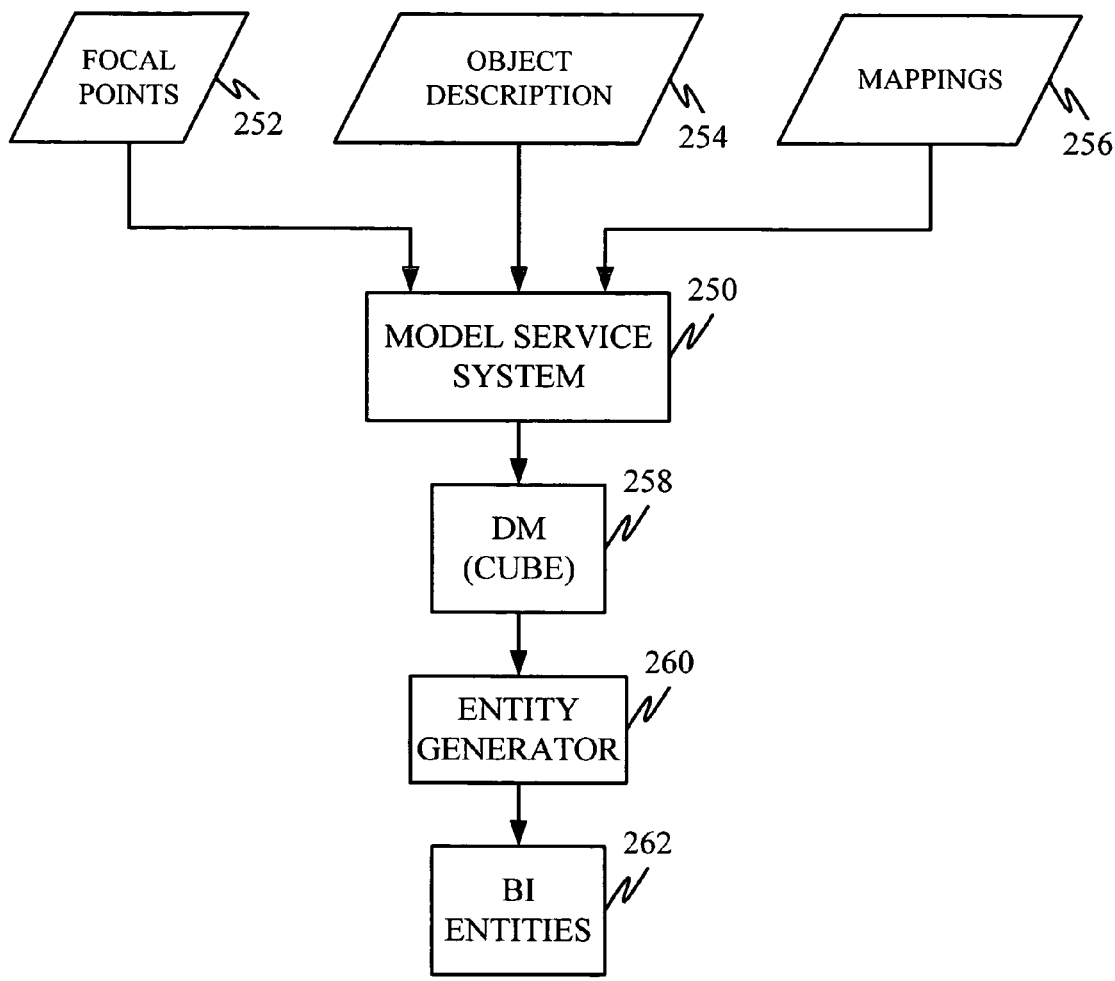
FIG. 4A is a block diagram of one embodiment of the present invention.

FIG. 4A is a simplified block diagram of one embodiment of the present invention. FIG. 4A illustrates a model services system 250 that takes, as inputs, a specification of focal points 252, an object description 254 and a set of persistent data store mappings 256. System 250 then produces a dimensional model 258 based on the inputs. As will be described below in relation to FIGS. 19 and 20, one aspect of the present invention pertains to data schema that enables a standardized description of inputs 252, 254 and/or 256. Model service system 250 is illustratively configured to generate dimensional model 258 based on information compiled within the organized schema format.

FIG. 4A also illustrates an entity generator 260 that generates a set of object (or entities), referred to herein as business intelligence entities (or BI entities) 262, based on the dimensional model 258.

Focal points 252 represent certain data in the object model that is marked by the user as being a focal point of analysis. Focal points 252 can illustratively be specified in an XML specification file. One example of an XML specification file is shown in Appendix A hereto.

Figure 4B:
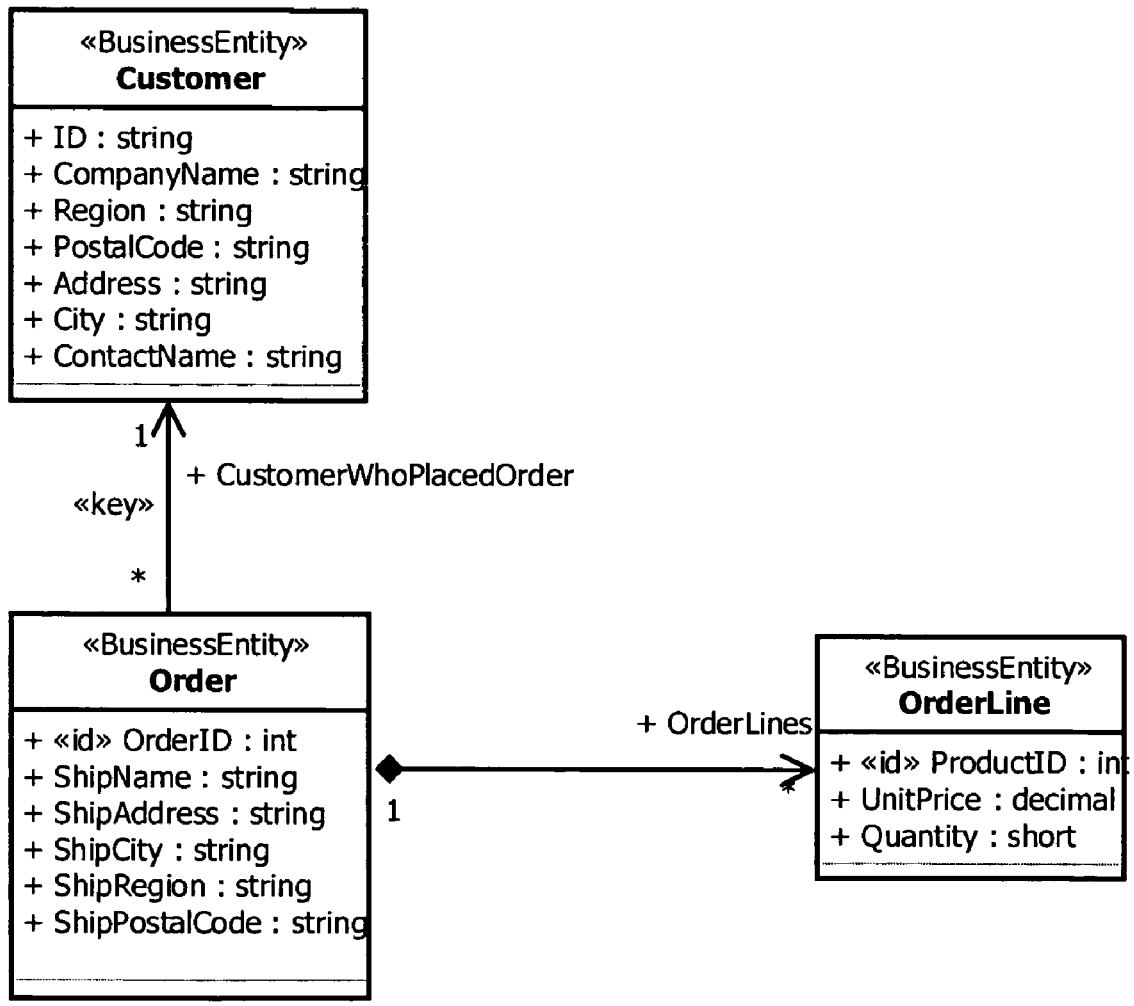
FIG. 4B is an example of an object model description in the form of a UML class diagram in accordance with one embodiment of the present invention.

Object description 254 is an input which describes the object orientation relationships in a set of metadata corresponding to a set of objects. This can take the form of, for example, a UML class diagram. One example of a UML class diagram for a plurality of business entities (Customer, Order and OrderLine) is illustrated in FIG. 4B.

Persistent data store mappings 256 map the data referred to by the object model to the persistent data store, in one illustrative embodiment the relational database 201 shown in FIG. 2. These are illustratively created by the user in the form of a map file, an example of which is found in Appendix B. The map file shown in Appendix B maps from a Customer entity to relational database tables.

Model services system 250 receives inputs 252, 254 and 256 and automatically generates a dimensional model 258 based on those inputs. In accordance with one embodiment of the present invention, dimensional model 258 is inferred from the inputs supplied by the user, and there is no requirement for a second set of developers to be involved in recreating the business logic to obtain model 258. In one embodiment, and as will be discussed in greater detail below, model services system 250 uses the associations and compositions in the object model specified by the object model description 254 to infer foreign key relationships in dimensional model 258. System 250 also uses the focal points of analysis defined by the user in file 252 and the persistent data store mappings 256 to create dimensional model 258 and access data through model 258. Therefore, one aspect of the invention is simply the automatic generation of dimensional model 258. In accordance with another aspect of the present invention, as will be described in relation to FIGS. 19-21, data provided to system 250 is organized in accordance with a standardized data schema, such as a standardized tagged format data schemata (e.g., an XML data schema).

However, even a system which automatically generates dimensional model 258 can be improved. For example, obtaining information through dimensional model 258 still requires the user to know MDX or some sort of dimensional model querying language. Therefore, in accordance with another embodiment of the present invention, entity generator 260 is provided. Entity generator 260 creates business intelligence entities 262 in the form of objects, from the cubes and dimensions in dimensional model 258. This is also described in greater detail below.

Figure 4C:
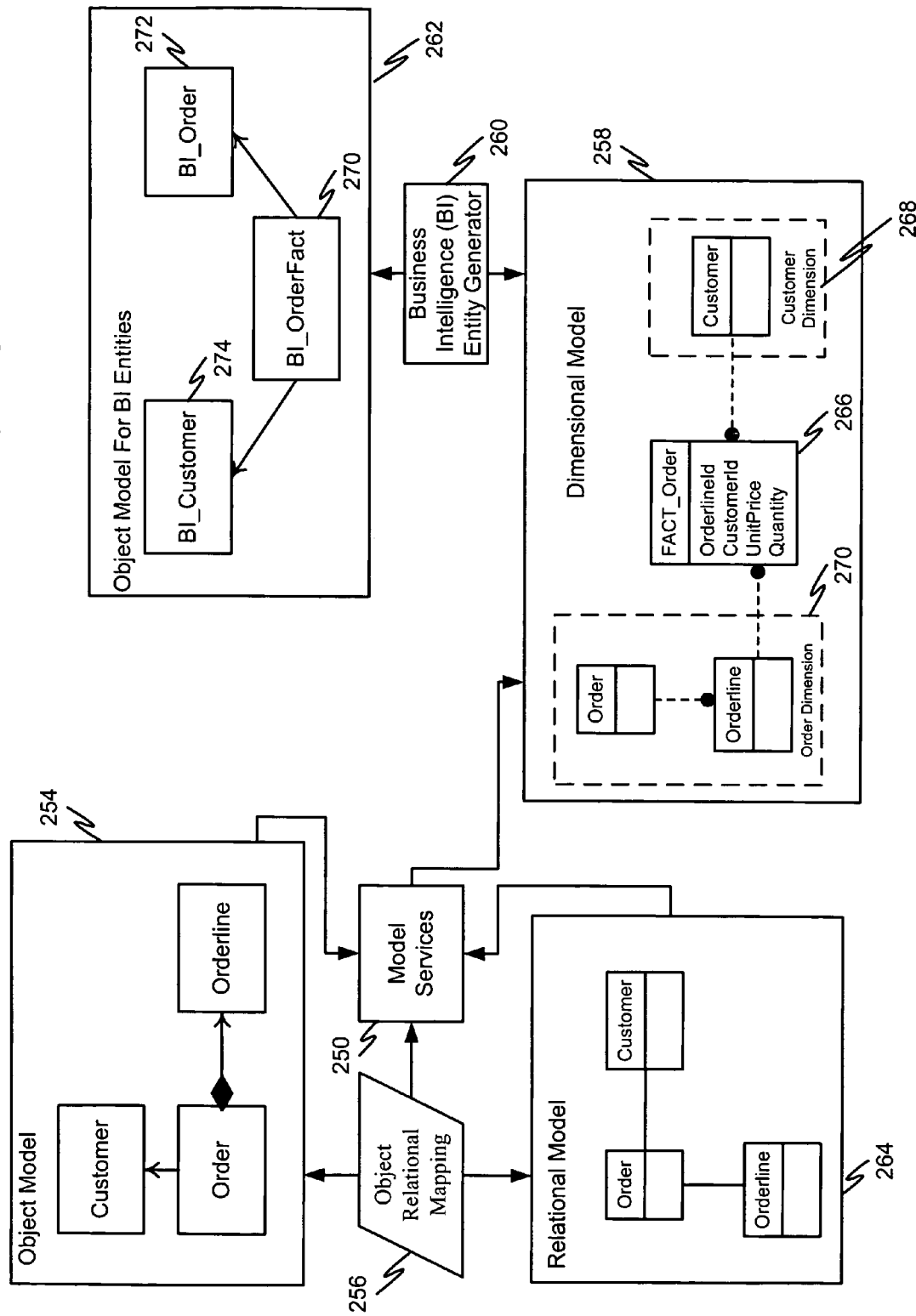
FIG. 4C is a more detailed block diagram of the system shown in FIG. 4A.

FIG. 4C illustrates the system shown in FIG. 4A, in greater detail. In the example illustrated in FIG. 4C, the object model is represented by object description 254, and the mappings 256 are shown between the object model representation 254 and the relational database representation 264 which represents relational database 201. Again, in accordance with one aspect the present invention that will be described in relation to FIGS. 19-21, information is provided to model services 250 in accordance with a standardized data schema.

FIG. 4C also shows dimensional model 258 in greater detail. Dimensional model 258 includes a Fact table 266 along with a plurality of dimensions 268 and 270 (the Customer dimension and the Order dimension). Each of the dimensions is formed of one or more tables. It is also worth noting that Fact table 266 includes the OrderlineID and CustomerID as foreign key references.

FIG. 4C also illustrates one embodiment of a set of BI entities 262. In the example shown in FIG. 4C, the BI entities 262 include a BIOrderFact entity 270, a BIOrder entity 272 and a BICustomer entity 274. Entities 272 and 274 are related to entity 270.

By looking at the entities and their relationships in object model description 254, it can be seen that the dimensional model will require a snowflake-schema, such as that shown in dimensional model representation 258. It can thus be inferred that two dimensions will be created, Order and Customer. The Order dimension will have two levels, Order and OrderLine. The measures (or numeric values) in the Fact table 266 will include UnitPrice and Quantity and will come from the OrderLine entities.

Figure 5:
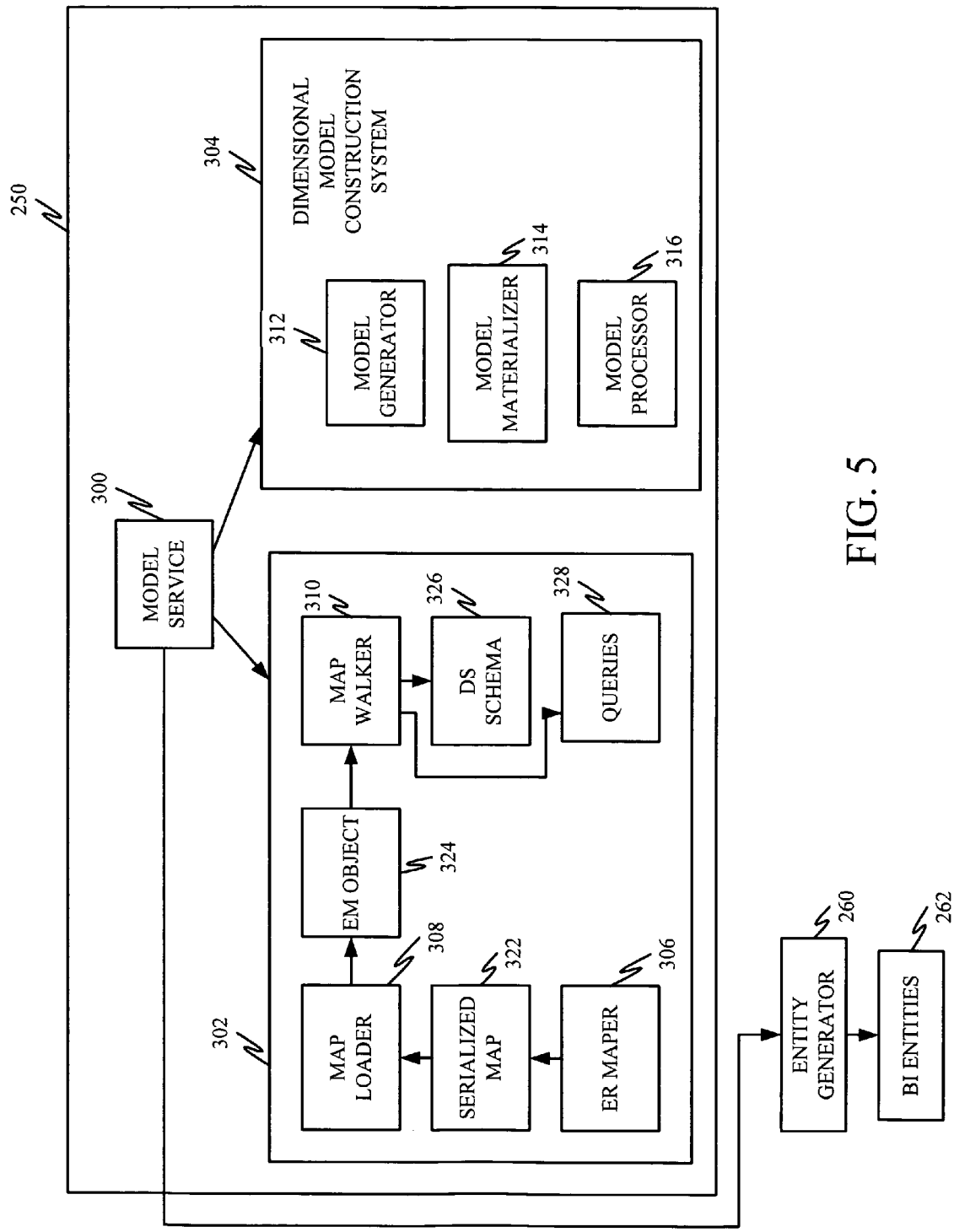
FIG. 5 is a more detailed block diagram of a model services component in accordance with one embodiment of the present invention.
Figure 6A:
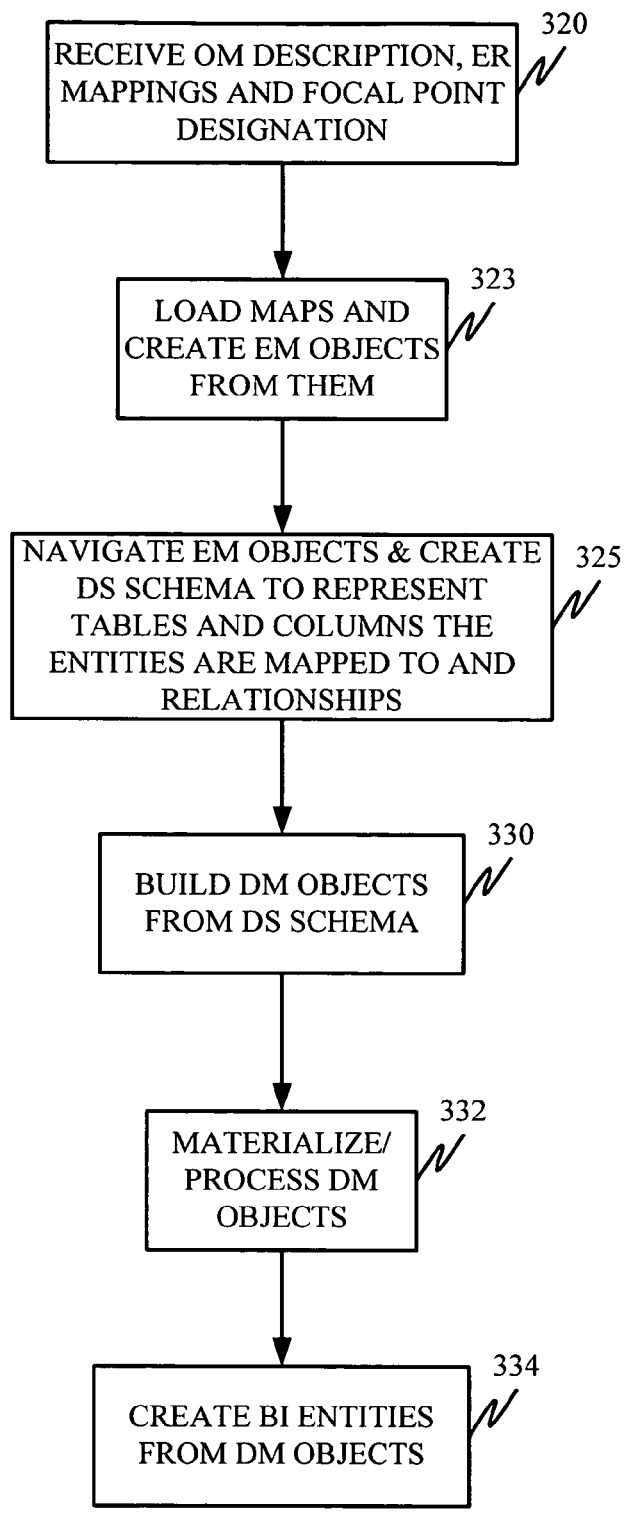
FIG. 6A is a flow diagram better illustrating the operation of the model services component shown in FIG. 5.

FIG. 5 is a more detailed block diagram of model services system 250. FIG. 6A is a flow diagram better illustrating the operation of system 250 shown in FIG. 5. FIGS. 5 and 6A will be described in conjunction with one another. FIG. 5 shows that model services system 250 includes a model service component 300, a map system 302 and a dimensional model construction system 304. Map system 302, in turn, includes entity relation (ER) mapper 306, map loader 308, and map walker 310. Dimensional model construction system 304 includes model generator 312, model materializer 314 and model processor 316. FIG. 5 also illustrates entity generator 260 and BI entities 262.

Model services component 300 provides a main user interface to accept focal point specification 252, object description 254 and ER mappings 256. As will be described in relation to FIGS. 19-21, in accordance with one aspect of the present invention, information (e.g., information items 252, 254 and 256) is provided to model service 300 in accordance with an organized data schema. The schema is illustratively configured to facilitate an automated process of constructing a dimensional model.

Model services component 300 can also invoke the functionality associated with map system 302, dimensional model construction system 304 and entity generator 260. Thus, as a first step in the conversion process, model services system 250 receives, through the top level interface implemented by component 300, focal point specification 252, object description 254 and persistent data storage mappings 256. This is indicated by block 320 in FIG. 6A.

Figure 6B:
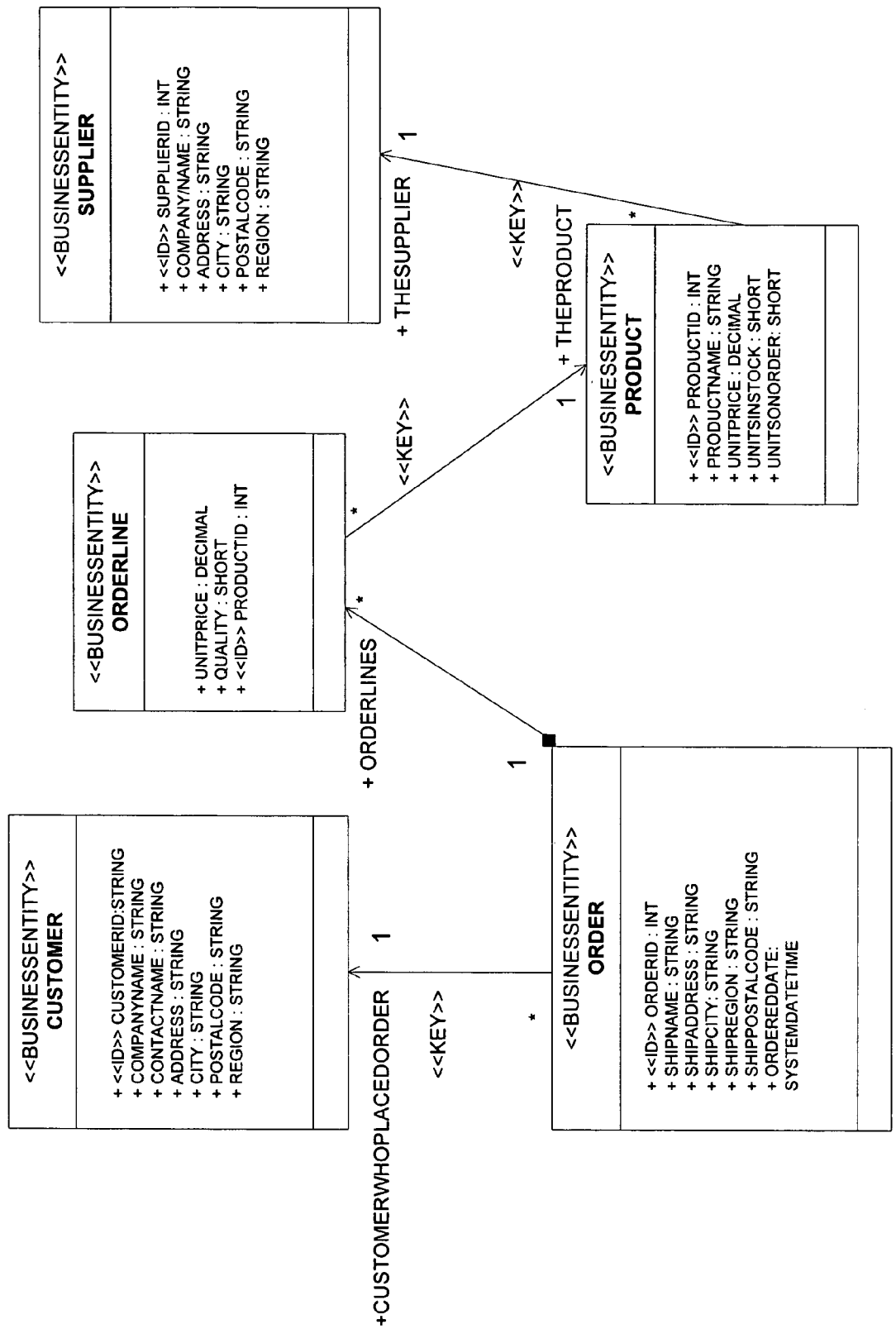
FIG. 6B is a more complex example of an object model description in the form of a UML class diagram.

For the sake of the present example, a more detailed object description than that shown in FIG. 4B is warranted. Therefore, assume for the sake of the present description that model services system 250 receives, as the object description, the UML class diagram shown in FIG. 6B. It is similar to that shown in FIG. 4B, except that it is slightly more complex and includes a bit more detail.

Model services component 300 provides these inputs to map system 302 and invokes certain functionality in map system 302. Using the ER mapper, the user produces serialized ER maps 256 to described how the object model is mapped to the relational database. These serialized maps 322 are then loaded by map loader 308. Map loader 308 deserializes those maps and converts them to entity map (EM) objects 324. The precise form of EM objects 324 is not important. They are simply objects generated from the serialized maps 322 that are predefined such that the structure of EM objects 324 is known by map walker 310. Loading maps 322 and creating EM objects 324 is indicated by block 323 in FIG. 6A.

Map walker 310 navigates EM objects 324 and generates a data set schema to represent tables and columns that the entities are mapped to in the relational database, and to represent the relationship among them. Navigating the EM objects to create data set schema 326 is indicated by block 325 in FIG. 6A. The data set schema 326 generated by map walker 340 forms the basis for constructing a dimensional model cube in the dimensional model. Map walker 310 can also fill in any additional information in the data set schema 326 required by the dimensional model. In addition, map walker 310 generates queries 328 to tables in the relational database that will be used to define Fact tables in the dimensional models. Schema 326 is then provided to dimensional model construction system 304. In particular, model generator 312 builds dimensional model cubes based on schema 326. Building the dimensional model cubes from data set schema 326 is illustrated by block 330 in FIG. 6A and is described in greater detail below with respect to FIG. 7.

Model materializer 314 provides an interface to materialize the dimensional models generated by model generator 312. Materializing the dimensional models is indicated by block 332 in FIG. 6A. Model processor 316 provides an interface to process the models materialized by model materializer 314. It should be noted that, at this point, the dimensional model can be queried using MDX or any other language used to query a multi-dimensional model. However, in accordance with a further embodiment of the present invention, entity generator 260 is invoked by system 250 to generate BI entities 262 from the dimensional model created. Creating BI entities from the dimensional model objects is illustrated by block 334 in FIG. 6A and is described in greater detail below with respect to FIGS. 10A-10B.

Figure 7:
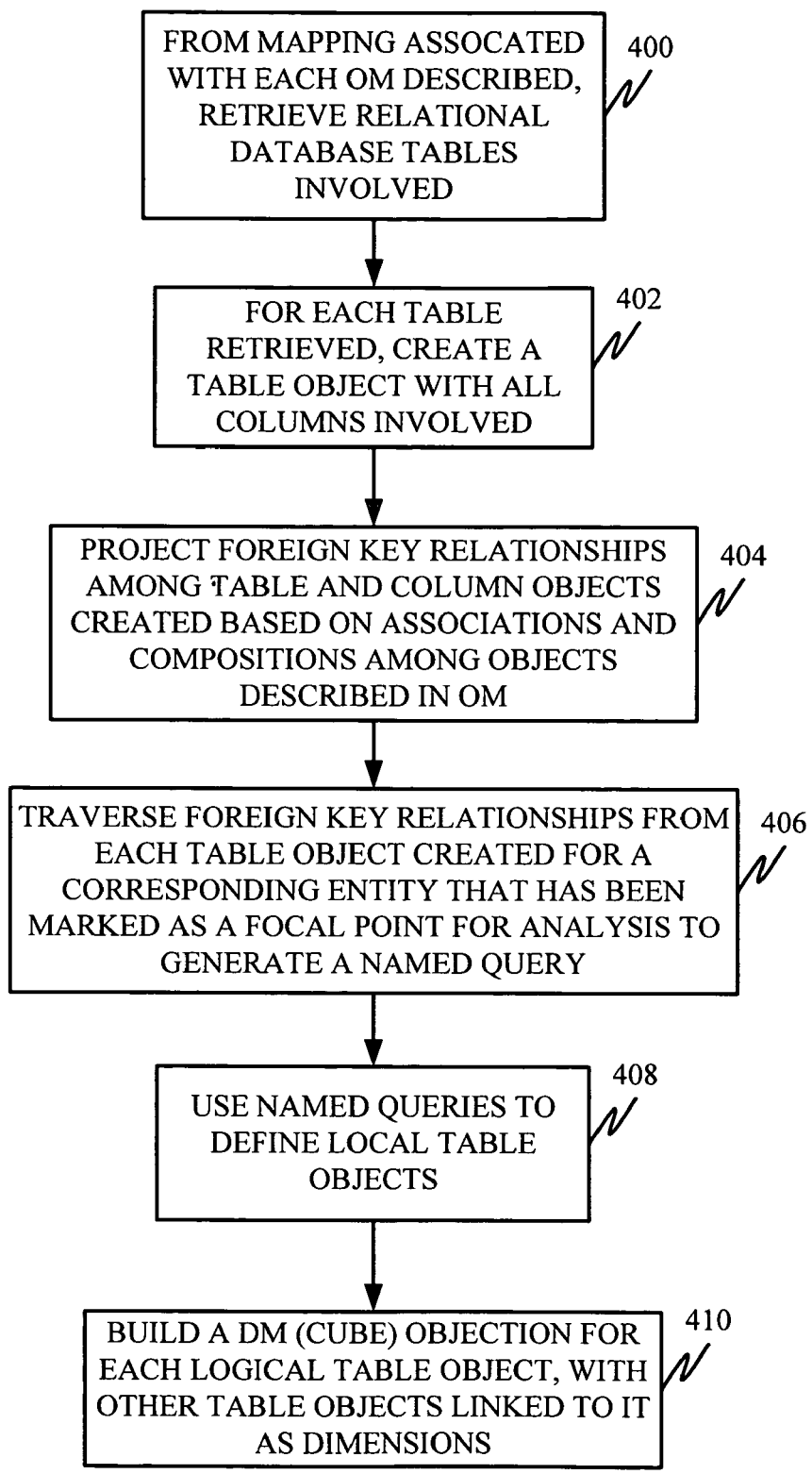
FIG. 7 is a flow diagram illustrating the creation of a dimensional model in accordance with one embodiment of the present invention.

FIG. 7 is a flow diagram better illustrating the creation of a dimensional model from an object model using the map walker 310 and dimensional model construction system 304 shown in FIG. 5. From the ER mappings associated with each entity in the object model described, the relational database tables involved with those entities are retrieved. This is indicated by block 400 in FIG. 7. For each table retrieved, a table object is created. The table object has fields which include all of the columns associated with the table. This is indicated by block 402 in FIG. 7.

Foreign key relationships among the table and column objects created are projected based on the associations and compositions among objects described in the object model description (such as the UML class diagram) being processed. The map walker 310 then traverses foreign key relationships from each table object created, for a corresponding entity that has been marked as a focal point for analysis. Recall that the focal points are specified by a focal point specification file which has also been input by the user. The foreign key relationships are traversed in a many-to-one direction toward table objects whose corresponding entity has been marked as a focal point for analysis, in order to generate a named query. The named query can be synthesized by combining the identified tables using an appropriate persistent data store query statement (such as a structured query language (SQL) statement). Thus, the named query is designed to reach out to other dimensions associated with each table object, based on focal points specified by the user.

Figure 8:
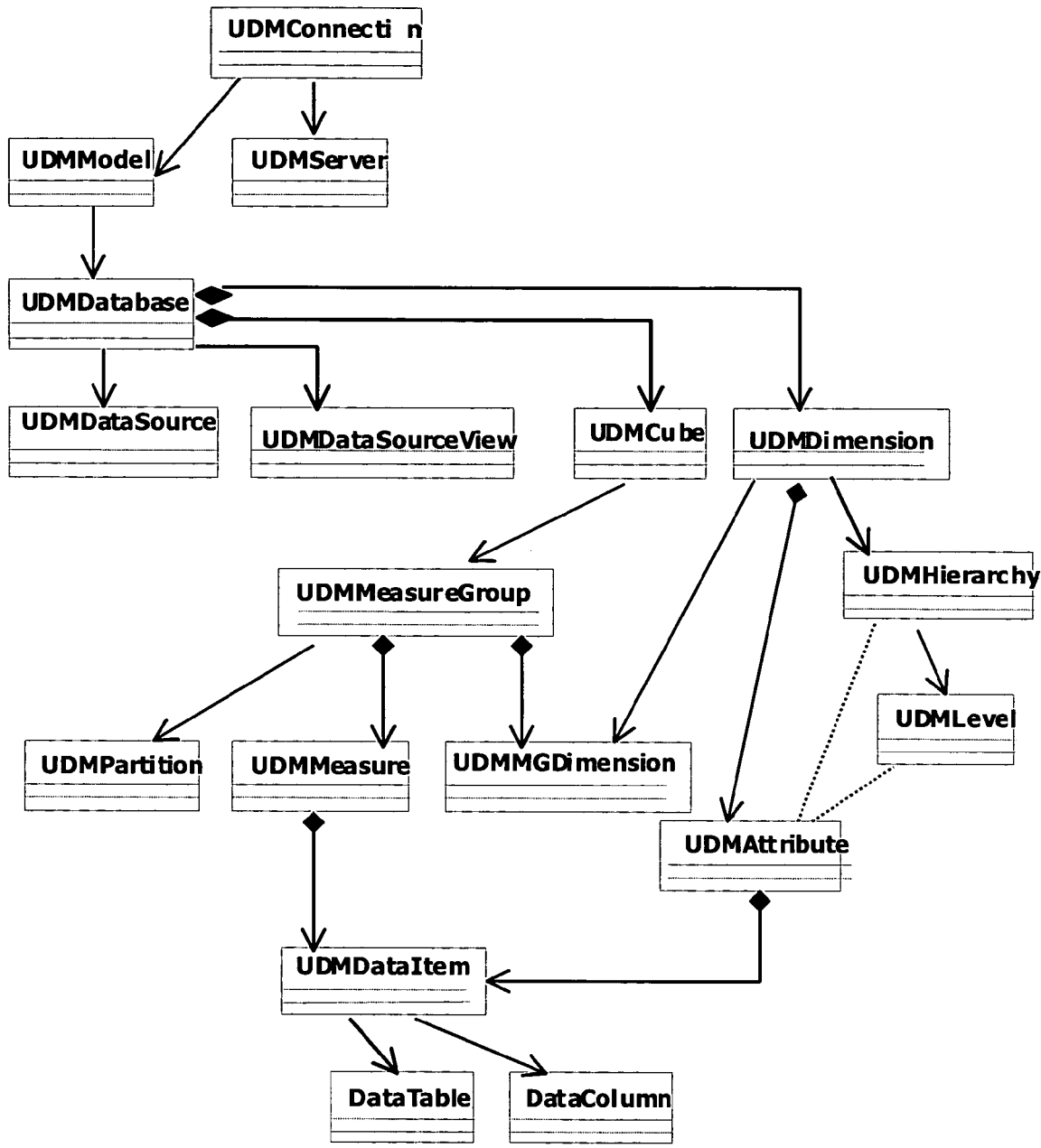
FIG. 8 is one embodiment of a class diagram for a generalized form of a multi-dimensional model.
Figure 9:
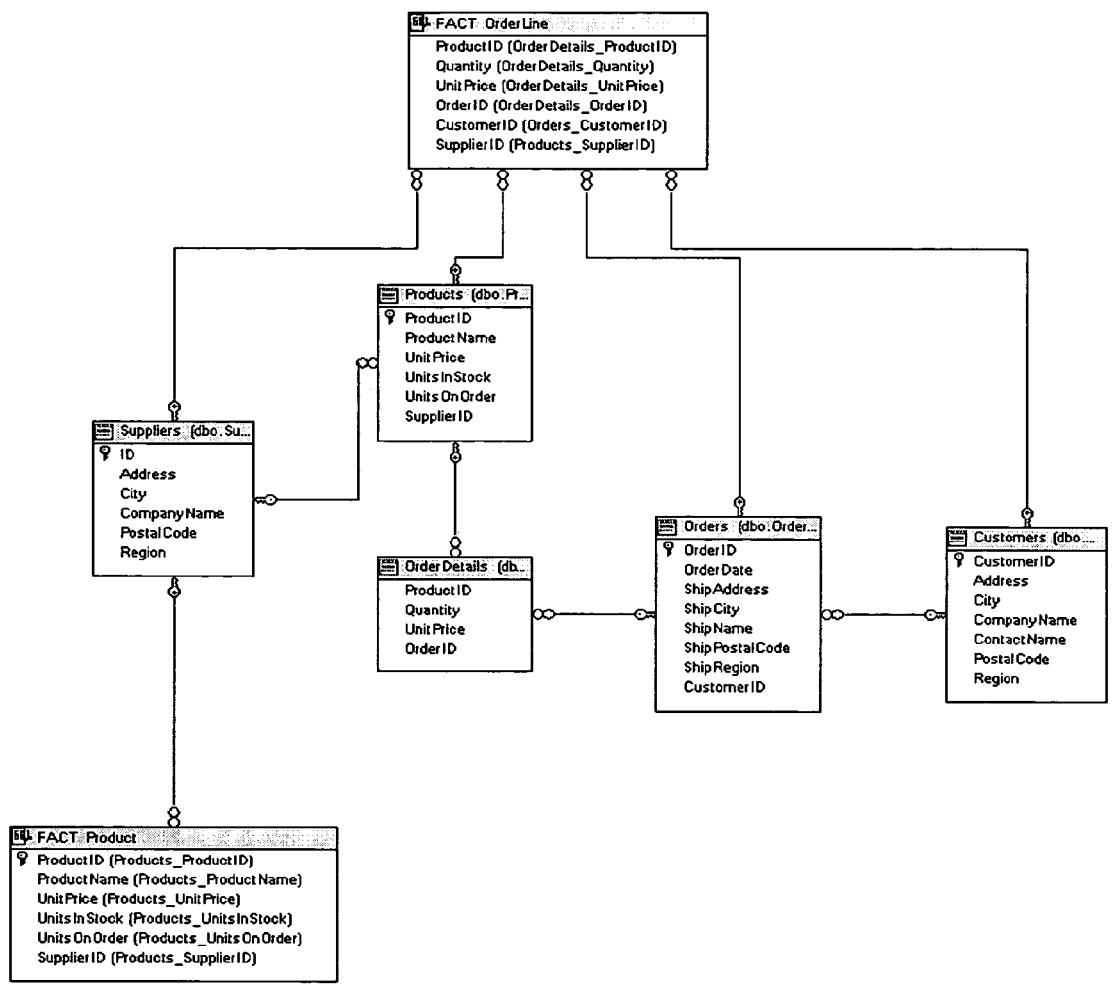
FIG. 9 is a specific example of a dimensional model in accordance with one embodiment of the present invention.

The named queries are then used to create logical view objects for the dimensional model. This is indicated by block 408. A dimensional model cube is then built for each logical table object, with other table objects linked to it as dimensions. This is indicated by block 410. FIG. 8 illustrates one exemplary class diagram for a generalized form of a multi-dimensional object in the dimensional model. FIG. 9 illustrates one exemplary dimensional model materialized and illustrating the foreign key relationships between the Fact table and the various dimensions associated with it.

Appendix C illustrates another embodiment of pseudo code illustrating how model services system 250 calls the various components thereof in order to implement the functionalities discussed.

It should be noted, at this point, that the dimensional model, an example of which is shown in FIG. 9, has been automatically generated by inferring foreign key relationships from the structure (compositions and associations) in the object model. The user can query the automatically generated dimensional model using tools designed for that purpose. As discussed above, MDX is a language designed to query a dimensional database.

Figure 10:
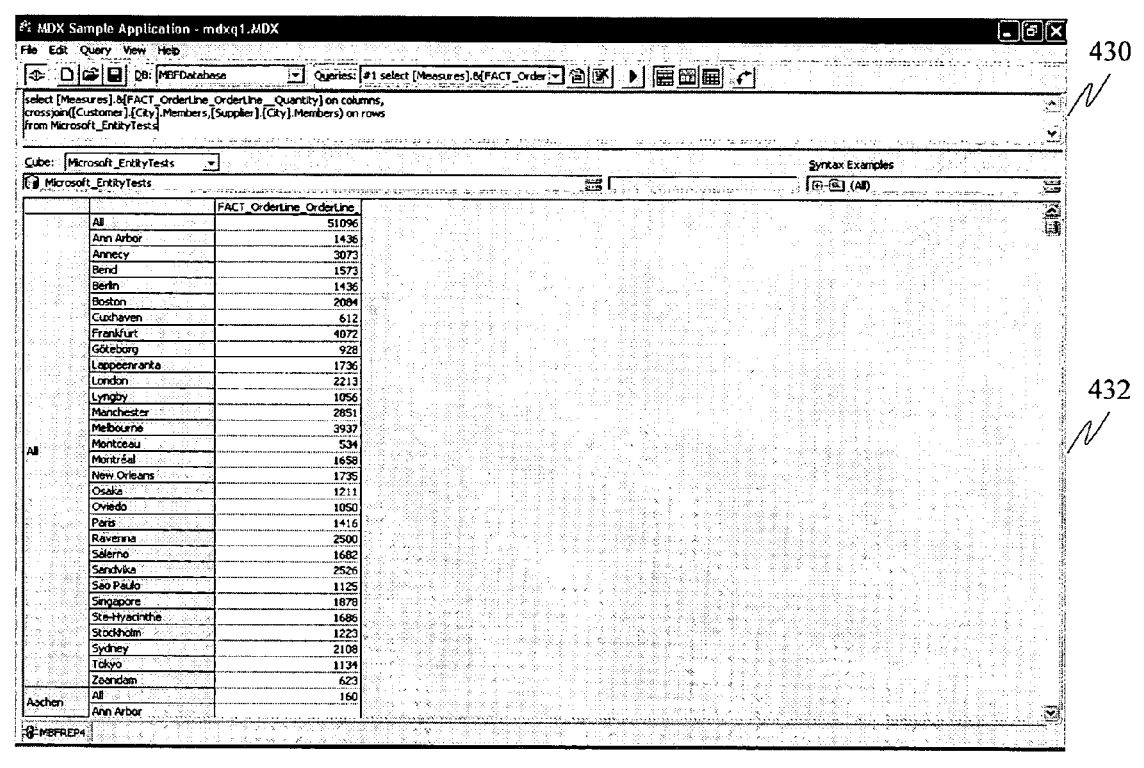

An exemplary query for querying the dimensional model illustrated by FIG. 9 is shown in FIG. 10. FIG. 10 shows a screen shot having a query field 430 which contains an MDX query expression. FIG. 10 also includes a result field 432 which contains the results returned by the query.

As also indicated above, MDX and other dimensional model querying languages can have fairly complex syntax or be otherwise difficult to learn. Therefore, another embodiment of the present invention converts the automatically created dimensional model into another set of objects referred to herein as BI entities 262 so that they can be queried by users using object oriented expressions, rather than the complicated syntactical expressions required by dimensional model querying languages. To satisfy the reporting requirements of the client it is not enough to query the original object model, because the dimensional model may have a Fact table which has attributes from two different entities in the object model as dimensions thereof. Therefore, in order to make it easier to access the dimensional model, in accordance with one embodiment of the present invention, BI entities 262 are created.

BI entities 262 provide a conventional object oriented view of the underlying dimensional model 258. A user can thus create efficient query criteria and consume dimensional data in a manner in which the actual querying of the dimensional model is performed transparently to the user. BI entities 262 hide the dimensional model details, such as the cube, the dimensions, the hierarchy, the native query language, etc., and the user is only required to use objects and attributes.

Figure 11A:
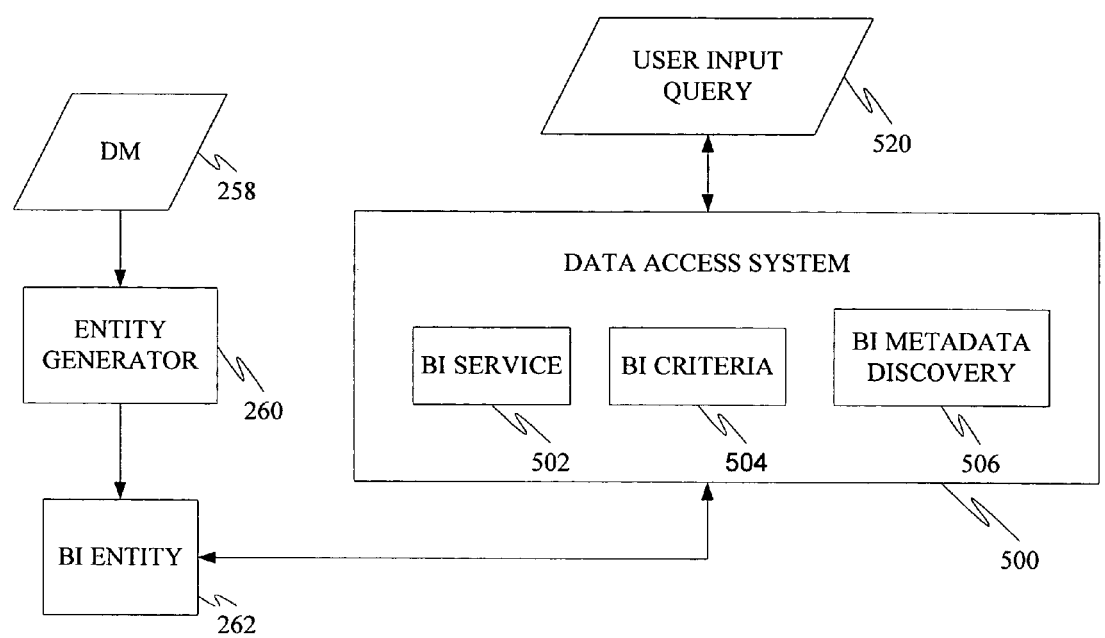
FIG. 11A is a block diagram of a system for creating a business entity and generating reports in accordance with one embodiment of the present invention.
Figure 11B:
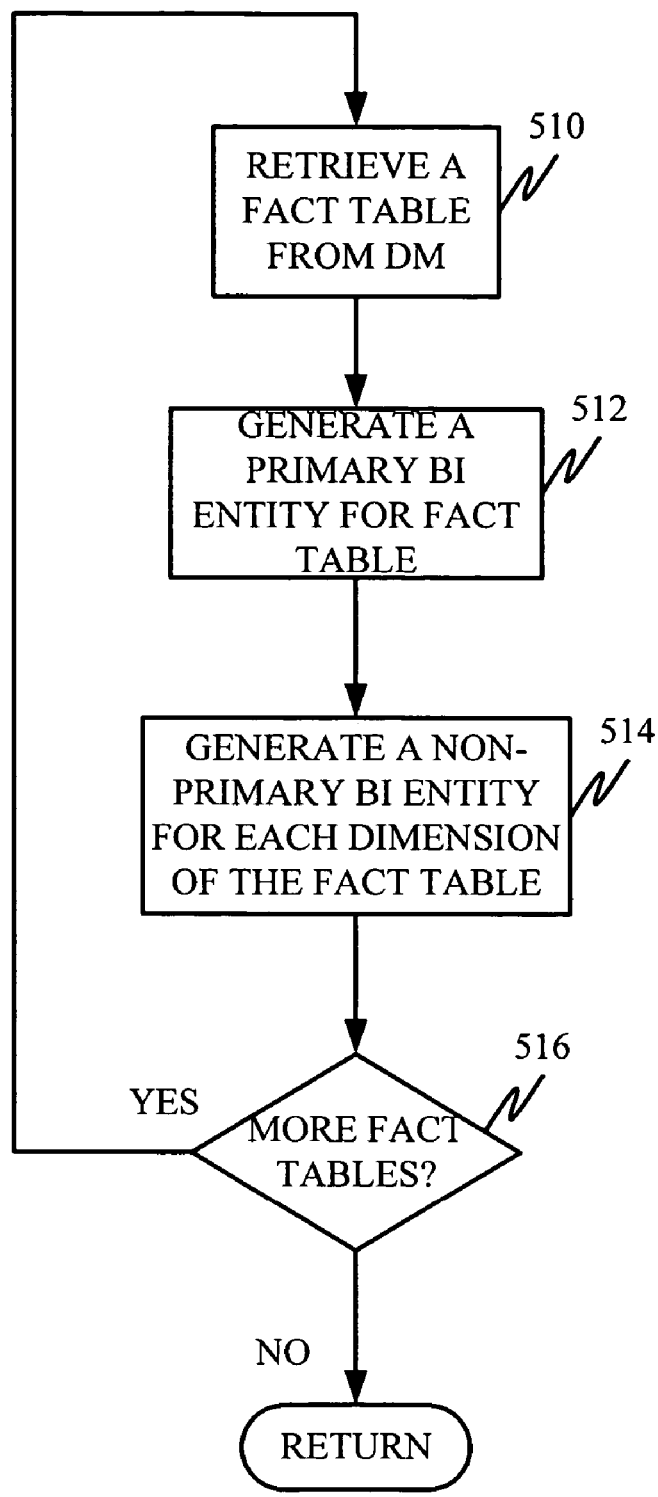
FIG. 11B is a flow diagram illustrating the creation of a business intelligence entity in accordance with one embodiment of the present invention.

FIG. 11A illustrates entity generator 258, along with data access system 500 which, itself, includes a BI service component 502, a BI criteria component 504 and a BI metadata discovery component 506. FIG. 11B is a flow diagram better illustrating how entity generator 258 generates BI entities 262.

In order to generate BI entities 262, recall that entity generator 260 has access to underlying dimensional model 258. Entity generator 260 first retrieves a Fact table from dimensional model 258. This is indicated by block 510 in FIG. 11B. Entity generator 260 then generates a primary BI entity for the Fact table retrieved. The numerical values (or measures) in the Fact table become the properties of the newly created BI entity. Generating a primary BI entity for the retrieved Fact table is indicated by block 512 in FIG. 11B.

Entity generator 260 then generates a non-primary BI entity for each dimension of the Fact table. It should be noted that nested classes can be used to maintain the original structure, hierarchy, and levels of the dimensional model. Generating the non-primary BI entities is indicated by block 514 in FIG. 11B. Entity generator 260 performs these operations for each Fact table in dimensional model 258, as indicated by block 516.

Figure 12:
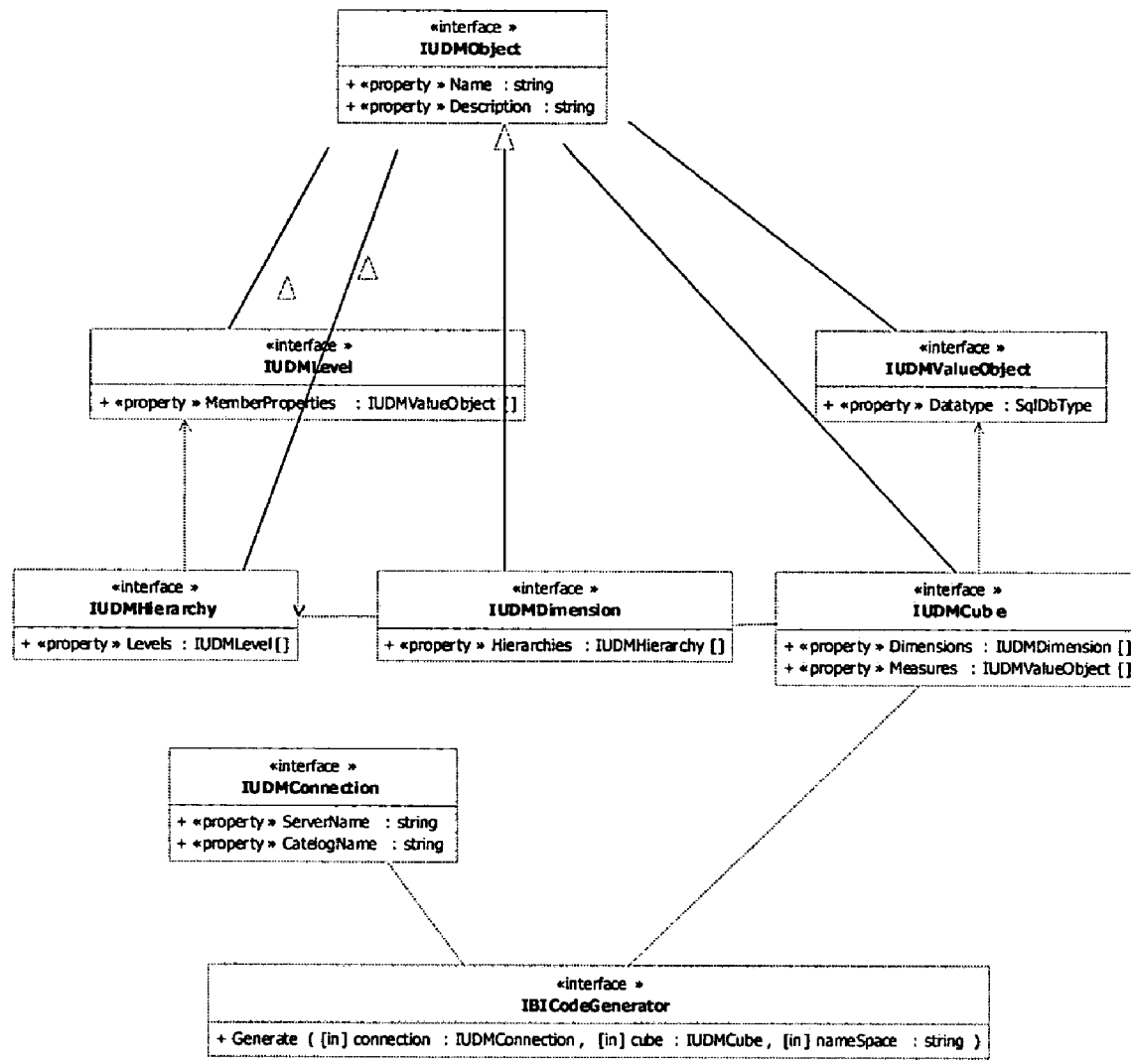
FIG. 12 illustrates one exemplary interface implemented by a service to generate code for accessing a created dimensional model.

FIG. 12 illustrates one exemplary interface implemented by the model service to generate code for accessing a created dimensional model. The interface allows the model service to convey information on the structure of the dimensional model to the code generator. A dimensional model consists of a cube with measures and a number of dimensions with hierarchies and attributes. FIG. 12 shows the relationships among these components of the dimensional model. The interface for invoking entity generator 260 is illustrated in FIG. 13. Appendix D illustrates the interfaces supported by the various components of system 250, and by entity generator 260.

Figure 14:
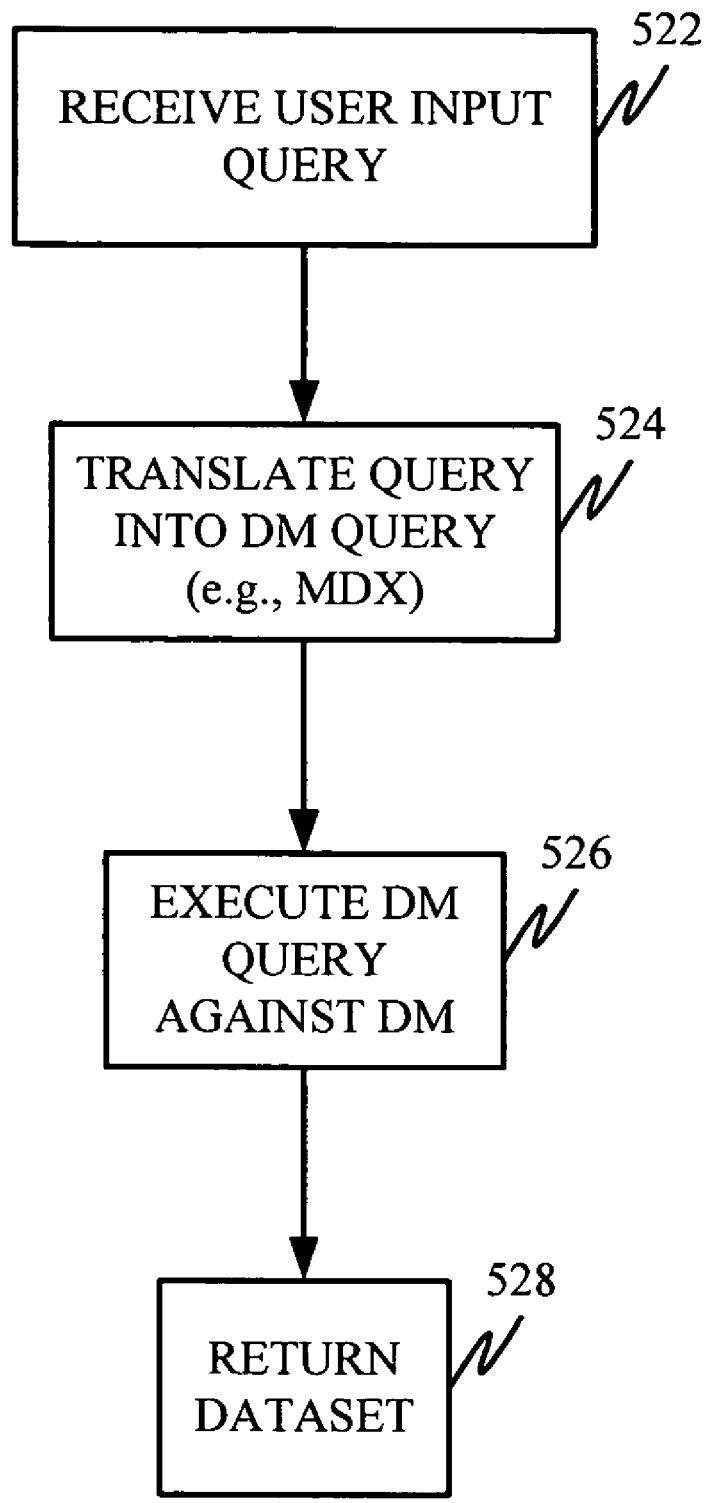
FIG. 14 is a flow diagram illustrating how data is retrieved from a business entity in accordance with one embodiment of the present invention.
Figure 16:
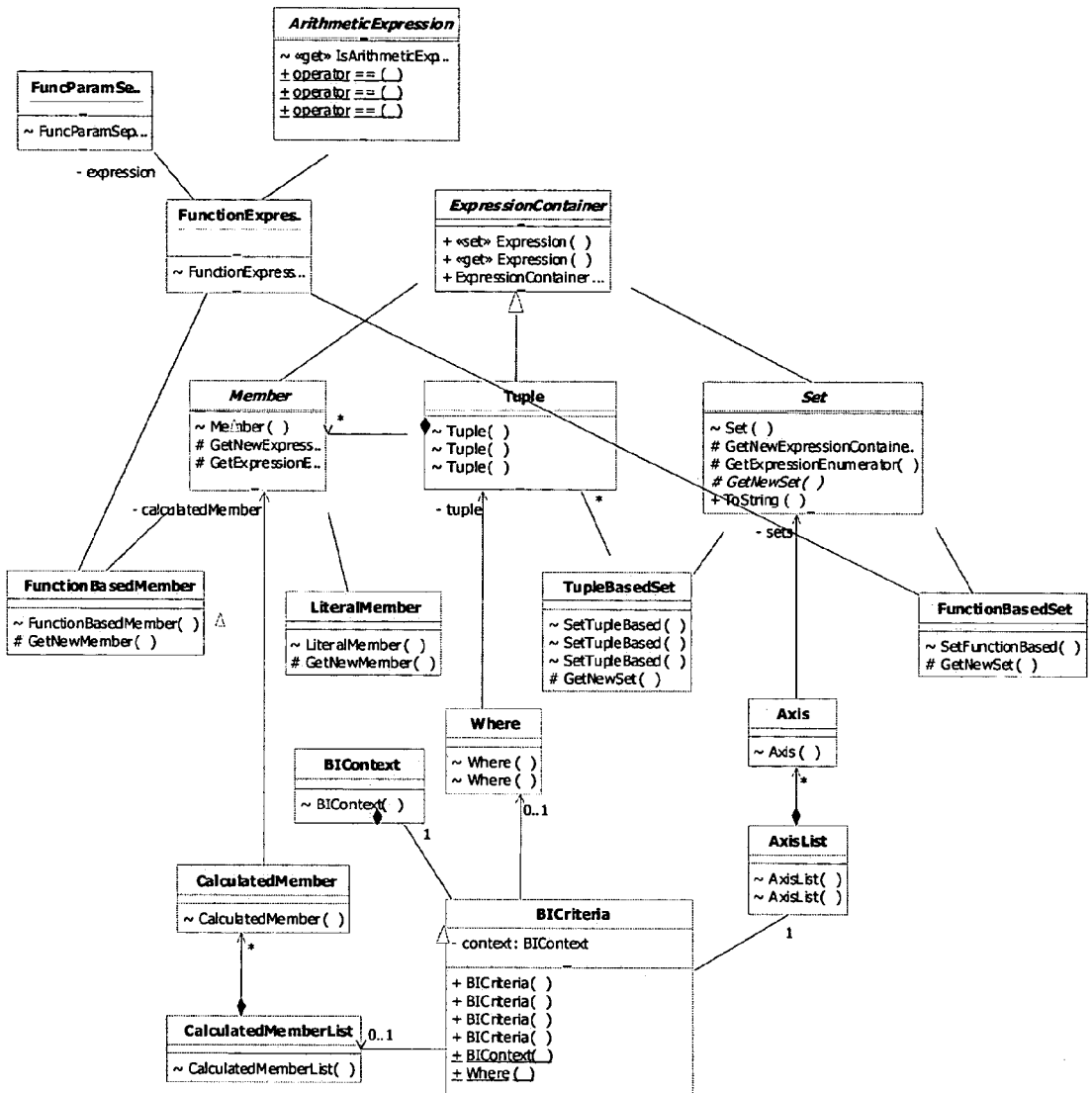
FIG. 16 illustrates one embodiment of a class diagram for a BI criteria component.

FIG. 14 is a flow diagram better illustrating how data represented by BI entities 262 is accessed using data access system 500. First, a user input query 520 is provided to data access system 500. Receiving the user input query is indicated by block 522 in FIG. 14. BI criteria component 504 illustratively provides an interface through which the user can input user input query 520. The BI criteria interface is illustrated in FIG. 15 and an illustrative class diagram for BI criteria component 504 is illustrated by FIG. 16.

Figure 17:
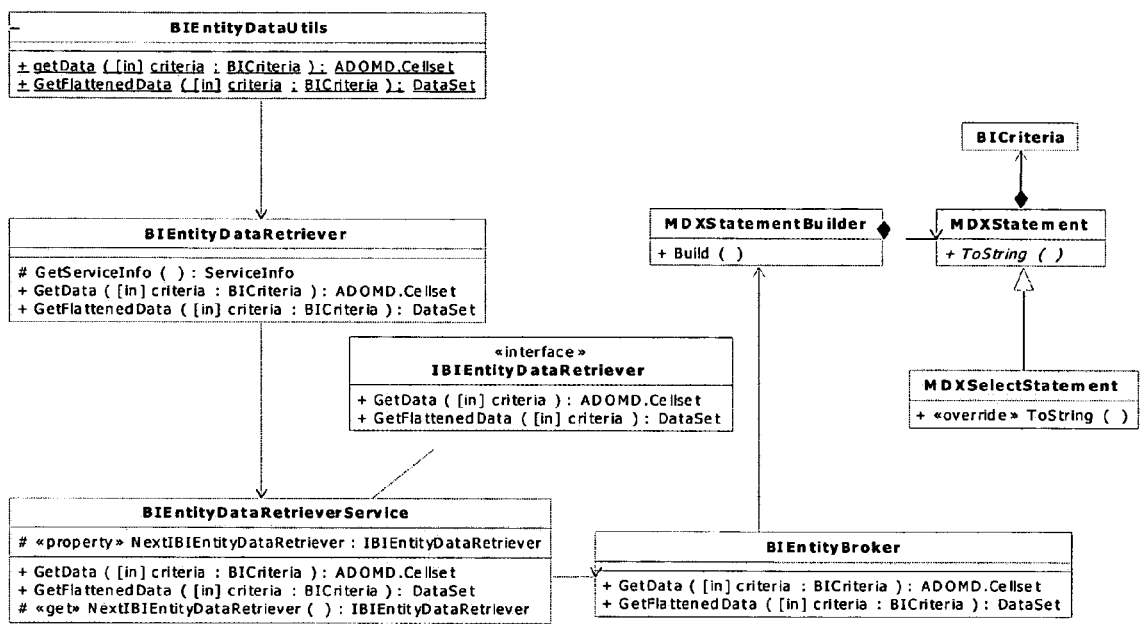
FIG. 17 is an exemplary class diagram of a BI service component.

The user input query 520, input through BI criteria 504, is converted by BI service component 502 into a dimensional model query expression, such as an MDX expression, which can be executed against the dimensional model 258. One exemplary class diagram for BI service component 502 is illustrated in FIG. 17. Translation of the user input query 520 into the dimensional model query and execution of the dimensional model query against the dimensional model are indicated by blocks 524 and 526 in FIG. 14. Of course, MDX is used as an example only, and any of a wide variety of different dimensional model query expressions can be supported by the BI criteria component 504. The following is one exemplary list of MDX expressions which are supported by BI service component 502 and BI criteria component 504, although it should be emphasized that other, different, or additional expressions can be supported as well:

MDX set functions supported:
Cross join, children, descendants, ancestors, all members, members, etc.;
MDX member functions supported:
CurrentMember, DefaultMember, FirstChild, LastChild, Lead, Lag, etc . . . ;
MDX numeric functions supported:
Average, Aggregate, count, sum, max, min, median, IIF, etc. . . .

Table 1 lists one exemplary set of MDX operators which are supported.

TABLE 1

Supported Operators

| MDX Operators | Equivalent C# Operators |
|---|---|
| + (Arithmetic) | + |
| − (Arithmetic) | − |
| * (Arithmetic) | * |
| / (Arithmetic) | / |
| < (Comparison) | < |
| > (Comparison) | > |
| <= (Comparison) | <= |
| >= (Comparison) | >= |
| <> (Comparison) | != |
| = (Comparison) | == |
| AND (Bitwise) | && |
| OR (Bitwise) | \|\| |
| NOT (Bitwise) | ! |
| XOR (Bitwise) | ^ |

The following illustrates one exemplary criteria definition which forms the user input query 520 in the C-Sharp programming language.

TABLE 2

```
//example with arithmetic operation
BICriteria crit = new BICriteria (
    BICriteria.BIContext (
        typeof(SalesBI) ),
    BICriteria.CalculatedMemberList (
        (BIProperty) "SalesBI.AveragePrice",
        (BIProperty) "SalesBI.SaleDolloars" /
(BIProperty) "BISales.SalesUnits" ),
    BICriteria.AxisList (
        Set.AllMembers ( (BIProperty)
"ProductBI.DeafultHierachy.Category"),
        Set.Members ( (BIProperty) "TimeBI.DefaultHierarchy.Quarter") ),
    BICriteria.Where (
        "StateBI.North America.USA.South West.California") );
    //example with logical operator
crit = new BICriteria (
    BICriteria.BIContext (
        typeof(SalesBI) ),
    BICriteria.CalculatedMemberList (
        (BIProperty) "SalesBI.profitable",
        ( (BIProperty) "SalesBI.SalesDollars" >
(BIProperty) "SalesBI.Expense") ),
    BICriteria.AxisList (
        Set.AllMembers ( (BIProperty) "SalesBI") ) );
```

After the dimensional model query is executed, BI service component 502 then returns a result set as indicated by block 528 in FIG. 14.

Finally, BI metadata discovery component 506 can also be provided. BI metadata discovery component 506 is illustratively provided to perform a system wide BI entity search and to return detailed metadata retrieved for one or more BI entities. Of course, this can be useful to the user.

An example of how data is accessed may be helpful. By way of example, assume that a Sales cube in dimensional model 258 has two measures, SalesUnits and SalesDollars, and one dimension "product" which in turn has only one hierarchy "cat", which in turn, has one level "category". The generated BI class codes illustratively looks as follows:

TABLE 3

```
namespace Microsoft.BusinessFramework.Reporting.BI.Test
{
    using System;
    using Microsoft.BusinessFramework.Reporting.BIEntity;
    /// <summary>
    /// Summary description for SalesBI.
    /// </summary>
    [BI(true,"Measures")]
    public class SalesBI : IBIEntity
    {
        //fields
        private Int32 saleUnits;
        private Double saleDollars;
        private ProductBI product;
        //constructor
        public SalesBI( ) {}
        //properties
        [BIProperty(BIPropertyType.Measure, "SaleUnits")]
        public Int32 SaleUnits
        {
            get
            {
                return saleUnits;
            }
            set
            {
                saleUnits = value;
            }
        }
        [BIProperty(BIPropertyType.Measure, "SaleDollars")]
        public Double SaleDollars
        {
            get
            {
                return saleDollars;
            }
            set
            {
                saleDollars = value;
            }
        }
        [BIProperty(BIPropertyType.Dimension, "product")]
        public ProductBI Product
        {
            get
            {
                return product;
            }
            set
            {
                product = value;
            }
        }
    }
    /// <summary>
    /// Summary description for ProductBI.
    /// </summary>
    [BI(false,"product")]
    public class ProductBI : IBIEntity
    {
        //fields
        private CatHierarchy cat;
        private CategoryHierarchy category;
        //constructor
        public ProductBI( ) {}
        //properties
```

TABLE 3-continued

```
        [BIProperty(BIPropertyType.Hierarchy, "cat")]
        public CatHierarchy CAT
        {
            get
            {
                return cat;
            }
            set
            {
                cat = value;
            }
        }
        [BIProperty(BIPropertyType.Hierarchy, "category")]
        public CategoryHierarchy Category
        {
            get
            {
                return category;
            }
            set
            {
                category = value;
            }
        }
    }
    /// <summary>
    /// Summary description for CatHierarchy.
    /// </summary>
    public class CatHierarchy
    {
        //fields
        private CategoryLevel category;
        //constructor
        public CatHierarchy( ) {}
        //properties
        [BIProperty(BIPropertyType.Level, "category")]
        public CategoryLevel Category
        {
            get
            {
                return category;
            }
            set
            {
                category = value;
            }
        }
    }
    /// <summary>
    /// Summary description for CategoryLevel.
    /// </summary>
    public class CategoryLevel
    {
        //fields
        private String @value;
        //constructor
        public CategoryLevel(String @value)
        {
            this.@value = @value;
        }
        //implicit conversion operator
        public static implicit operator String
        (CategoryLevel obj)
        {
            return obj.@value;
        }
        //properties
    }
    /// <summary>
    /// Summary description for CategoryHierarchy.
    /// </summary>
    public class CategoryHierarchy
    {
        //fields
        private CategoryLevel category;
        //constructor
        public CategoryHierarchy( ) {}
        //properties
```

TABLE 3-continued

```
    [BIProperty(BIPropertyType.Level, "category")]
    public CategoryLevel Category
    {
        get
        {
            return category;
        }
        set
        {
            category = value;
        }
    }
    /// <summary>
    /// Summary description for CategoryLevel.
    /// </summary>
    public class CategoryLevel
    {
        //fields
        private String @value;
        //constructor
        public CategoryLevel(String @value)
        {
            this.@value = @value;
        }
        //implicit conversion operator
        public static implicit operator String
        (CategoryLevel obj)
        {
            return obj.@value;
        }
        //properties
    }
  }
 }
}
```

One example of a user input query input through BI criteria component 504 is as follows:

TABLE 4

```
BICriteria crit = new BICriteria(
    BICriteria.BIContext(
            typeof(Microsoft_EntityTestsBI)
    ),
    BICriteria.AxisList(
        BICriteria.Axis(
    (BIProperty)"Microsoft_EntityTestsBI.FACT_Product_Product_UnitsInStock",
    (BIProperty)"Microsoft_EntityTestsBI.FACT_OrderLine_OrderLine_UnitPrice"),
        BICriteria.Axis(Set.Members((BI Property)"OrderBI"))));
```

Figure 18:
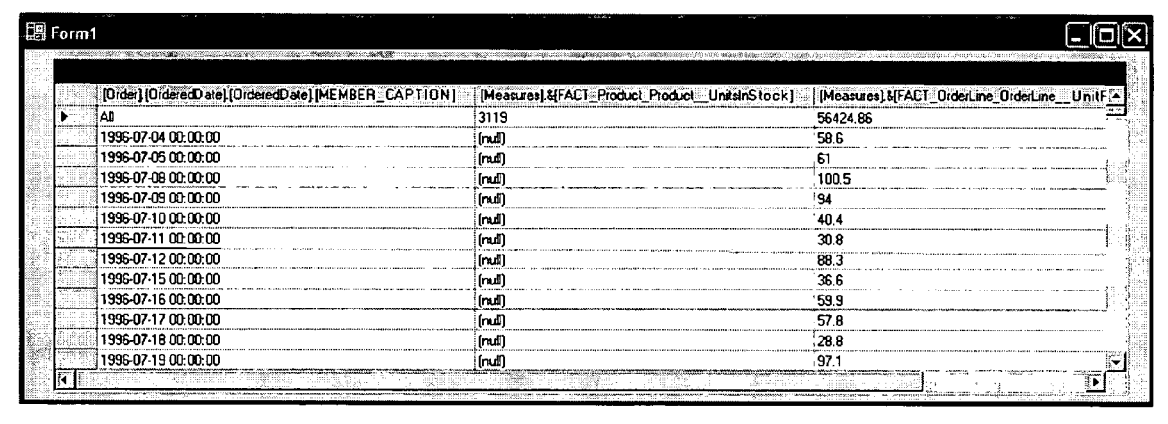

An illustrative and exemplary result set returned based on the user input query is shown in FIG. 18.

It can thus be seen that the present invention provides a number of significant advantages over prior systems. One aspect of the present invention automatically generates a dimensional model from an object model. The automatic generation is performed by inferring the dimensional model from relationships specified in the object model and user-designated focal points, as well as mappings back to the relational database. In accordance with one embodiment, the information upon which the inference of the dimensional model is based is provided to the generator (e.g., the model service generator) in accordance with a an organized data schema, illustratively a tagged format data schema (e.g., an XML data schema.

In another embodiment of the present invention, objects are provided to abstract away from the specifics of a dimensional model. Therefore, a user can access a dimensional model using only object oriented expressions, without requiring specific knowledge of any dimensional model querying language.

Of course, in another embodiment of the present invention, both systems are used together such that the dimensional model is automatically created from a user-specified object model, and the entities which abstract away from the dimensional models are automatically created as well. Thus, all a user must do is provide the focal points, a description of the object model and its persistent data storage mappings, and this embodiment of the present invention automatically generates the necessary components for the user to access the data according to a desired reporting structure using only object oriented expressions without going through the laborious tasks of manually creating a dimensional model and then generating dimensional model-specific queries against the dimensional model.

In relation to FIG. 4A, it was described that a model services system 250 takes, as inputs, a specification of focal points 252, an object description 254 and a set of persistent data store mappings 256. System 250 then produces a dimensional model 258 based on the inputs. In accordance with one aspect of the present invention, a standardized model definition schema, such as but not limited to a tagged format data schema, is provided to format the system 250 inputs so as to support the autonomous generation of the dimensional model.

In accordance with one embodiment, the standardized model definition schema is an XML schema that enables an object-relational model to be specified and decorated with extra metadata so as to support inference of a dimensional model therefrom. In accordance with one embodiment, the schema supports description of any or all of the following data elements:

1. Classes in the object orientation paradigm (illustratively known as entities in the schema) and their data members (illustratively known as fields in the schema)
2. Object-relational mappings that specify how data members of the classes can be filled with data retrieved from column values of tables in a relational database
3. Key fields (from a class) that uniquely identify an instance of a class
4. A name field in a class that uniquely identifies an instance of the class and is more understandable than the key fields
5. Association and composition relationships among the classes, including how they are represented by linkages among data members
6. Measures that represent interesting numerical values used for the generation of the dimensional model.

Based on information organized within the provided standardized schema, a processing engine (e.g., model services system 250) is illustratively configured to develop (e.g., autonomously generate) a dimensional model. The schema provides a predictable data format to the processing engine.

In accordance with one embodiment, an overview of a model definition schema designed for the described purpose is expressed using XSD as follows:

```xml
<?xml version="1.0" encoding="utf-8" ?>
<schema attributeFormDefault="unqualified" elementFormDefault="qualified"
targetNamespace="http://www.mds.microsoft.com" xmlns="http://www.w3.org/2001/XMLSchema"
xmlns:ms="http://www.mds.microsoft.com">
    <element name="Entities" type="ms:Entities" />
    <complexType name="Entities">
        <sequence>
            <element minOccurs="1" maxOccurs="unbounded" name="Entity" type="ms:Entity"/>
        </sequence>
        <attribute name="name" type="string" use="required" />
        <attribute name="namespace" type="string" use="optional" />
    </complexType>
    <complexType name="Entity">
        <sequence>
            <element minOccurs="1" maxOccurs="1" name="Table" type="ms:Table" />
            <element minOccurs="1" maxOccurs="1" name="Fields" type="ms:Fields" />
            <element minOccurs="0" maxOccurs="1" name="Associations" type="ms:Associations" />
            <element minOccurs="0" maxOccurs="1" name="Compositions" type="ms:Compositions" />
            <element minOccurs="0" maxOccurs="1" name="Hierarchies" type="ms:Hierarchies" />
        </sequence>
        <attribute name="name" type="string" use="required" />
        <attribute name="base" type="string" use="optional" />
        <attribute name="parent" type="string" use="optional" />
    </complexType>
    <complexType name="Table">
        <attribute name="name" type="string" use="required" />
        <attribute name="sql" type="string" use="optional" />
    </complexType>
    <complexType name="Fields">
        <sequence>
            <element minOccurs="1" maxOccurs="unbounded" name="Field" type="ms:Field" />
        </sequence>
    </complexType>
    <complexType name="Field">
        <attribute name="name" type="string" use="required" />
        <attribute name="type" type="string" use="required" />
        <attribute name="column" type="string" use="optional" />
        <attribute name="sqltype" type="string" use="optional"/>
        <attribute name="measure" type="boolean" use="optional" />
        <attribute name="keycol" type="boolean" use="optional" />
        <attribute name="namecol" type="boolean" use="optional" />
        <attribute name="timedim" type="boolean" use="optional" />
    </complexType>
    <complexType name="Associations">
        <sequence>
            <element minOccurs="1" maxOccurs="unbounded" name="Association" type="ms:Association" />
        </sequence>
    </complexType>
    <complexType name="Association">
        <sequence>
            <element minOccurs="1" maxOccurs="unbounded" name="FieldRefPairs" type="ms:FieldRefPairs" />
        </sequence>
        <attribute name="name" type="string" use="required" />
        <attribute name="otherentity" type="string" use="required" />
        <attribute name="hierarchical" type="boolean" use="optional" />
    </complexType>
    <complexType name="FieldRefPairs">
        <sequence>
            <element minOccurs="1" maxOccurs="unbounded" name="FieldRefPair" type="ms:FieldRefPair" />
        </sequence>
    </complexType>
    <complexType name="FieldRefPair">
        <attribute name="thisfield" type="string" use="required" />
        <attribute name="otherfield" type="string" use="required" />
    </complexType>
    <complexType name="Compositions">
        <sequence>
            <element minOccurs="1" maxOccurs="unbounded" name="Composition" type="ms:Composition" />
        </sequence>
    </complexType>
    <complexType name="Composition">
        <sequence>
            <element minOccurs="1" maxOccurs="unbounded" name="FieldRefPairs" type="ms:FieldRefPairs" />
        </sequence>
```

-continued

```
        <attribute name="name" type="string" use="required" />
        <attribute name="otherentity" type="string" use="required" />
    </complexType>
    <complexType name="Hierarchies">
        <sequence>
            <element minOccurs="1" maxOccurs="unbounded" name="Hierarchy" type="ms:Hierarchy" />
        </sequence>
    </complexType>
    <complexType name="Hierarchy">
        <sequence>
            <element minOccurs="1" maxOccurs="unbounded" name="Levels" type="ms:Levels" />
        </sequence>
        <attribute name="name" type="string" use="required" />
    </complexType>
    <complexType name="Levels">
        <sequence>
            <element minOccurs="1" maxOccurs="unbounded" name="Level" type="ms:Level" />
        </sequence>
    </complexType>
    <complexType name="Level">
        <attribute name="number" type="string" use="required" />
        <attribute name="fieldref" type="string" use="required" />
    </complexType>
</schema>
```

With regard to the above defined schema embodiment, the root XML tag is the <Entities> tag. This root tag, similar to most of the tags in the schema, has an attribute called "name". The name attribute of the <Entities> tag provides a name for the model being defined.

Under the <Entities> tag, one or more <Entity> elements are defined. As was mentioned previously, entity is illustratively equivalent to a class in the object orientation paradigm of programming. An entity has a name, a reference to its base (in an inheritance hierarchy) and its parent (in a composition hierarchy). An <Entity> element contains five potential child elements (Table, Fields, Associations, Compositions and Hierarchies).

The <Table> element specifies primary database table fields that the containing <Entity> are mapped to. It can illustratively be either a physical database table or a logical table defined by the result of a SQL statement.

The <Fields> element is utilized to declare multiple <Field> elements that the entity is consisted of. Each <Field> element illustratively contains information on how the field is mapped to a database table column.

The <Associations> element and <Compositions> element declare multiple <Association> elements and <Composition> elements, respectively. Each <Association> element illustratively declares how a set of fields of its entity is related to a set of fields in another entity in a many-to-one relationship. Each <Composition> element serves a similar purpose but for one-to-many relationships.

A <Hierarchy> element under <Hierarchies> declares a semantic hierarchical relationship among a subset of fields organized in levels (for example, Country, State, County and Zip Code).

With these overall tags and their described general functions in mind, description will now turn to embodiments pertaining to illustrative details for these and other tags, as well as to related attributes.

-Entities-

Description

The <Entities> element is the root element of the schema (e.g., the root element of an XML document). It represents the model being defined.

Attributes name: The name uniquely identifies the model. It is used as the basis for the name of the cube generated in the dimensional model.

namespace: This is an optional namespace that is used for code generated to facilitate data access from the inferred dimensional model.

Child Elements

Entity: An <Entities> element consists of multiple <Entity> elements, each of which specifies an entity defined for the model.

-Entity-

Description

The <Entity> element specifies an entity of the model. It represents the concept of a class in the object-orientated programming paradigm.

Attributes name: The name uniquely identifies the entity in the set of entities in the model. It is used as the basis for the name of the dimension created for the entity in the dimensional model.

base: This tag provides the name of the base entity for this entity within an inheritance hierarchy.

parent: This tag provides the name of the parent entity of this entity within a composition hierarchy. The parent entity will have a composition relationship to this entity.

Child Elements

Table: This is the primary database table from which the fields of the entity declared under the <Fields> element will retrieve values. Refer to the section on the <Table> element for rules governing the use of the element.

Fields: This is a list of <Field> elements defined for the entity. The entity also inherits additional fields from its base entity. Refer to the section on the <Field> element for the rules governing the definition and database mapping of inherited fields.

Associations: This is an optional list of <Association> elements defined for the entity. The entity may also inherit additional associations from its base entity. Refer to the section on the <Association> element for more details.

Compositions: This is an optional list of <Composition> elements defined for the entity. The entity may also inherit additional compositions from its base entity. Refer to the section on the <Composition> element for more details.

Hierarchies: This is an optional list of <Hierarchy> elements defined for the entity. A hierarchy is defined in terms of fields from the entity. Refer to the section on the <Hierarchy> element for more details.

-Table-

Description

This is the logical database table from which the fields of the entity declared under the <Fields> element retrieve values. The table can either be a real database table or a virtual table consisting of data returning from the given SQL query.

It should be noted that an entity can inherit additional fields from its base entity which are not declared under this entity's <Fields> element but under the base entity's <Fields> element. In that case, those fields will retrieve values from the base entity's <Table> element if the table name is not an empty string. Otherwise, those fields will retrieve values from this entity's <Table> element.

If the same field is declared under the <Fields> elements of both this entity and its base entity, the definition under this entity will illustratively override the definition under the base entity. Also, this makes the field an implicit link between the tables defined under the two entities. A database join operation on the two tables using the link is used to retrieve values for the full set of fields in the derived entity, including those which are inherited from its base.

Attributes name: This is the name of the logical database table from which fields of the entity declared under the <Fields> element are retrieving values. If the entity is abstract, which means that its fields are only mapped by its derived entities, the name of the table can be an empty string.

sql: This is the SQL query which defines the data for the entity, if a physical database table is not named.

Child Elements
NONE

-Field-

Description

This declares a field for the entity and also optionally maps the field to a database column under the table declared for the entity.

Attributes name: This is the name of the field. If a field has the same name as one of the fields declared under a base entity, the definition under this entity illustratively overrides the definition in the base entity in terms of the database table mapping. See the "column" attribute.

type: This is the data type of the field. The set of data types allowed is dependent at least on the software platform for which the model is designed. One exemplary platform to which the present invention is not limited, is the Microsoft NET platform offered by Microsoft Corporation of Redmond, Wash.

column: This is the name of the column in the table to which the field is mapped. If the same field is also declared in the base entity, this column mapping illustratively takes precedence over the column mapping in the base entity. However, the two columns also provide a link for the two tables under the two entities. The link is used to construct a join query to obtain a full set of field values for the derived entity (including those inherited from the base entity). If the table element for this entity has an empty string as its name, the column attribute illustratively provides a default column name for the mapping of this field in all of its derived entities. As explained, the mapping can be overridden.

sqltype: This specifies the SQL data type for the column. For example, char(20), int, money, etc.

keycol: This is an optional boolean value used to indicate whether the field is part of the primary key of the entity. Key columns so declared become the key columns of the dimension constructed in the dimensional model. The keycol property is inherited alongside the field by any derived entities.

namecol: This is an optional boolean value used to indicate whether the field is the name column of the entity. The name column is used in the axes of the result set of a query on the dimensional model. If no namecol is declared, one of the key columns will be used as the name column.

measure: This is an optional boolean value used to indicate whether the field will be used as the point of focus in the construction of the cube in the dimensional model. The default value is "false". The field so declared should be of a numeric type.

timedim: This is an optional boolean value used to indicate whether the field will be used to construct a time dimension for measures declared in the same entity. The default value is "false". The field so declared should be of a datetime type.

Child Elements
NONE

-Association-

Description

An association links the containing entity with another entity in a many-to-one relationship. The association is defined in terms of a collection of FieldRefPair, each of which links a field in the containing entity with a field in the other entity.

Attributes name: This is a name which uniquely identifies an association.

otherentity: This is a name reference to the other entity with which the containing entity is related. The entity should be declared in the same model.

hierarchical: This is an optional boolean value used to indicate whether this entity is related to the other entity in a hierarchical way semantically. Default value is "false". For example, the "County" entity is so related to the "State" entity. This forms the basis of constructing hierarchies in the dimensional model.

Child Elements

FieldRefPairs: This is a collection of FieldRefPair each of which relates a field of this entity with a field of the related entity. See the section under FieldRefPair for more details.

-FieldRefPair-

Description

This is a reference to a pair of fields useful in the definition of either an association or a composition relationship. One of the fields belongs to the entity hosting the definition while the other belongs to the other entity defined under the relationship. Note that the references can actually be fields defined under the base entities of the entities involved.

Attributes thisfield: This is a name reference to the field in this entity (or any of its base entities).

otherfield: This is a name reference to the field in the other entity (or any of its base entities) of the containing association or composition relationship.

Child Elements
NONE

-Composition-

Description

A composition links the entity with another entity in a one-to-many relationship. The composition is defined in terms of a collection of FieldRefPair, each of which links a field in the containing entity with a field in the other entity.

Attributes name: This is a name which uniquely identifies an composition.

otherentity: This is a name reference to the other entity with which the containing entity is related. The entity should be declared in the same model.

Child Elements
NONE

-Hierarchy-

Description

A hierarchy defines a semantically hierarchical relationship among a subset of fields defined in this entity.

Attributes name: This is a name which uniquely identifies a hierarchy within the context of an entity. It will be used as a basis for naming the hierarchy constructed under the dimension built for the entity.

Child Elements

Levels: This is a list of <Level> elements, each of which references a field in the containing entity. See the section for the <Level> element for more details.

-Level-

Description

This is a level in a hierarchy, which references a field in the containing entity.

Attributes number: This is the level number of the element in its containing hierarchy. A lower level number field has a lower granularity. For example, the State field has a lower level number as the County field.

fieldref: This is the name reference to a field of the containing entity which defines the level.

Child Elements
NONE

With regard to the above-described standardized data schema embodiment, to further describe the nature of the above-described schema tags, as well as their related attributes and child elements, an example object-relational data model will now be provided. The example model is made up several distinct entities, namely, SalesDoc, Customer, Order, OrderLine, Product, Supplier and Category. The model includes a basic inheritance scenario, use of hierarchies and hierarchical association, as well as the declaration of a time dimension. The SalesDoc entity is an abstract base entity for the Order entity, which has a composition relationship with OrderLine and an association relationship with Customer. The Category entity has a hierarchical association relationship with the Product entity. The field of Order.OrderDate has been tag with the "timedim" attribute so that it will be used as a time dimension. Also, a collection of fields in the Customer and Supplier entities are declared to be part of hierarchies. Both the Freight field under the Order entity and the OrderQuantity field under the OrderLine entity have been marked as a measure.

Figure 19:
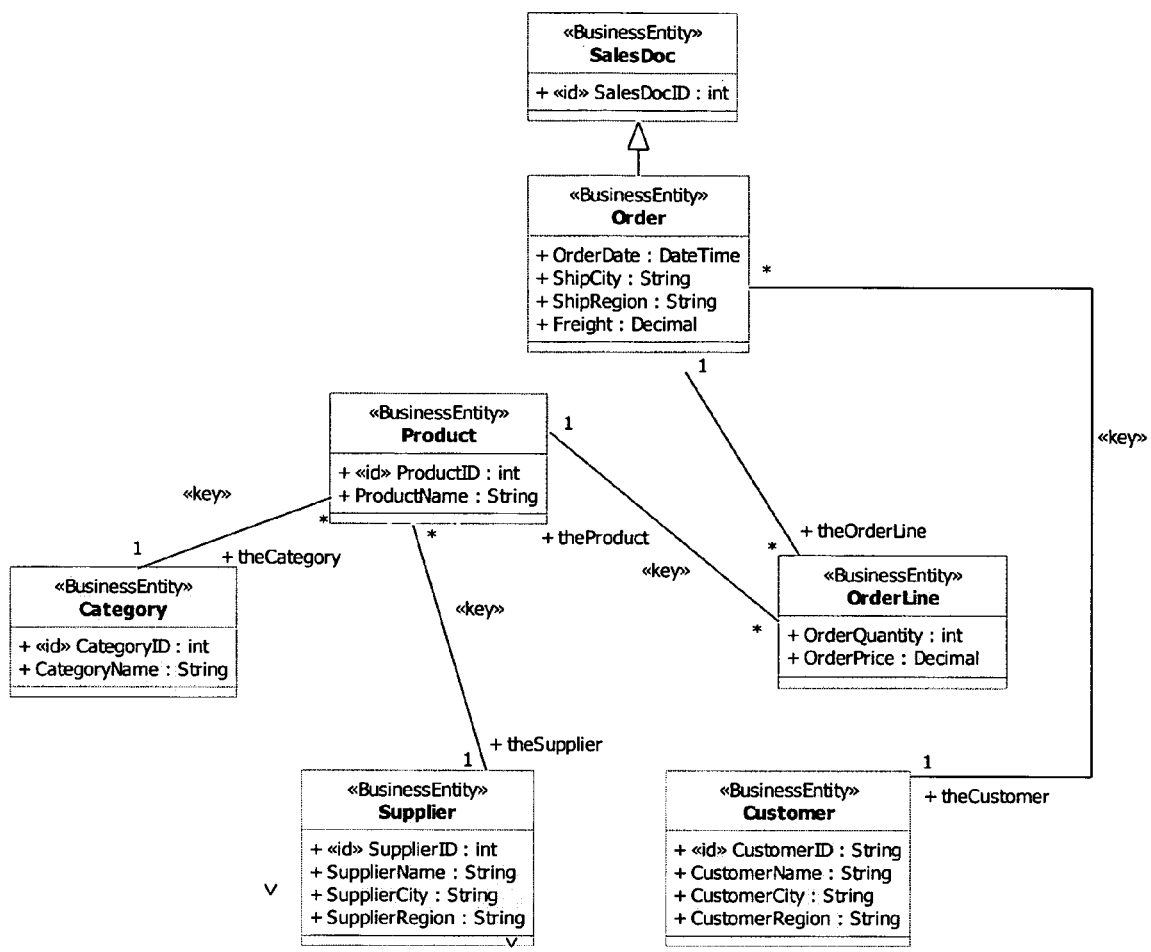
FIG. 19 illustrates a UML diagram that illustrates a particular object-relational data model.

FIG. 19 illustrates a UML diagram representing the described example object-relational data model.

Organized in a manner consistent with the above-described standardized data schema embodiment, the example object-relational data model is characterized and formatted as follows:

```
<?xml version="1.0" encoding="utf-8" ?>
<Entities xmlns="http://www.mds.microsoft.com" name="Sales">
<Entity name="SalesDoc" base="" parent="">
<Table name=""></Table>
<Fields>
<Field name="SalesDocID" keycol="true" type="System.Int32" column="SalesDocID" sqltype="int"></Field>
<Field name="CustomerID" type="System.String" column="CustomerID" sqltype="nvarchar(5)"></Field>
</Fields>
<Associations>
<Association name="SalesDoc_Customer" otherentity="Customer">
<FieldRefPairs>
<FieldRefPair thisfield="CustomerID" otherfield="CustomerID"/>
</FieldRefPairs>
</Association>
</Associations>
</Entity>
<Entity name="Order" base="SalesDoc">
<Table name="Orders"></Table>
<Fields>
<Field name="OrderDate" timedim="true" type="System.DateTime" column="OrderDate" sqltype="datetime"></Field>
```

-continued

```
<Field name="ShipCity" type="System.String" column="ShipCity" sqltype="nvarchar(15)"></Field>
<Field name="ShipRegion" type="System.String" column="ShipRegion" sqltype="nvarchar(15)"></Field>
<Field name="Freight" measure="true" type="System.Decimal" column="Freight" sqltype="money"></Field>
</Fields>
<Compositions>
<Composition name="Order_OrderLine" otherentity="OrderLine">
<FieldRefPairs>
<FieldRefPair thisfield="SalesDocID" otherfield="OrderID"/>
</FieldRefPairs>
</Composition>
</Compositions>
<Hierarchies>
<Hierarchy name="ShipLocation">
<Levels>
<Level number="1" fieldref="ShipRegion"></Level>
<Level number="2" fieldref="ShipCity"></Level>
</Levels>
</Hierarchy>
</Hierarchies>
</Entity>
<Entity name="OrderLine" base="" parent="Order">
<Table name="OrderDetails"></Table>
<Fields>
<Field name="OrderID" type="System.Int32" column="OrderID" sqltype="int"></Field>
<Field name="OrderQuanity" measure="true" type="System.Int32" column="Quantity" sqltype="smallint"></Field>
<Field name="OrderPrice" type="System.Decimal" column="UnitPrice" sqltype="money"></Field>
<Field name="ProductID" type="System.Int32" column="ProductID" sqltype="int"></Field>
</Fields>
<Associations>
<Association name="OrderLine_Product" otherentity="Product">
<FieldRefPairs>
<FieldRefPair thisfield="ProductID" otherfield="ProductID"/>
</FieldRefPairs>
</Association>
</Associations>
</Entity>
<Entity name="Product" base="" parent="">
<Table name="Products"></Table>
<Fields>
<Field name="ProductID" keycol="true" type="System.Int32" column="ProductID" sqltype="int"></Field>
<Field name="ProductName" namecol="true" type="System.String" column="ProductName" sqltype="nvarchar(40)"></Field>
<Field name="SupplierID" type="System.Int32" column="SupplierID" sqltype="int"></Field>
<Field name="CategoryID" type="System.Int32" column="CategoryID" sqltype="int"></Field>
</Fields>
<Associations>
<Association name="Product_Supplier" otherentity="Supplier">
<FieldRefPairs>
<FieldRefPair thisfield="SupplierID" otherfield="SupplierID"/>
</FieldRefPairs>
</Association>
<Association name="Product_Category" otherentity="Category" hierarchical="true">
<FieldRefPairs>
<FieldRefPair thisfield="CategoryID" otherfield="CategoryID"/>
</FieldRefPairs>
</Association>
</Associations>
</Entity>
<Entity name="Category" base="" parent="">
<Table name="Categories"></Table>
<Fields>
<Field name="CategoryID" keycol="true" type="System.Int32" column="CategoryID" sqltype="int"></Field>
<Field name="CategoryName" namecol="true" type="System.String" column="CategoryName" sqltype="nvarchar(15)"></Field>
</Fields>
</Entity>
<Entity name="Supplier" base="" parent="">
<Table name="Suppliers"></Table>
<Fields>
<Field name="SupplierID" keycol="true" type="System.Int32" column="ID" sqltype="int"></Field>
<Field name="SupplierName" namecol="true" type="System.String" column="CompanyName" sqltype="nvarchar(40)"></Field>
<Field name="SupplierCity" type="System.String" column="City" sqltype="nvarchar(15)"></Field>
<Field name="SupplierRegion" type="System.String" column="Region" sqltype="nvarchar(15)"></Field>
</Fields>
<Hierarchies>
<Hierarchy name="SupplierLocation">
```

-continued

```
<Levels>
<Level number="1" fieldref="SupplierRegion"></Level>
<Level number="2" fieldref="SupplierCity"></Level>
<Level number="3" fieldref="SupplierName"></Level>
</Levels>
</Hierarchy>
</Hierarchies>
</Entity>
<Entity name="Customer" base="" parent="">
<Table name="Customers"></Table>
<Fields>
<Field name="CustomerID" keycol="true" type="System.String" column="CustomerID" sqltype="nvarchar(5)"></Field>
<Field name="CustomerName" namecol="true" type="System.String" column="CompanyName" sqltype="nvarchar(40)"></Field>
<Field name="CustomerCity" type="System.String" column="City" sqltype="nvarchar(15)"></Field>
<Field name="CustomerRegion" type="System.String" column="Region" sqltype="nvarchar(15)"></Field>
</Fields>
<Hierarchies>
<Hierarchy name="CustomerLocation">
<Levels>
<Level number="1" fieldref="CustomerRegion"></Level>
<Level number="2" fieldref="CustomerCity"></Level>
<Level number="3" fieldref="CustomerName"></Level>
</Levels>
</Hierarchy>
</Hierarchies>
</Entity>
</Entities>
```

This data organized within the described tagged format data schema enables its underlying object-relational data model to be specified and decorated with metadata so that a dimensional model can be inferred therefrom. In accordance with one embodiment, a processing engine configured to support the data schema autonomously generates a corresponding dimensional model.

Figure 20:
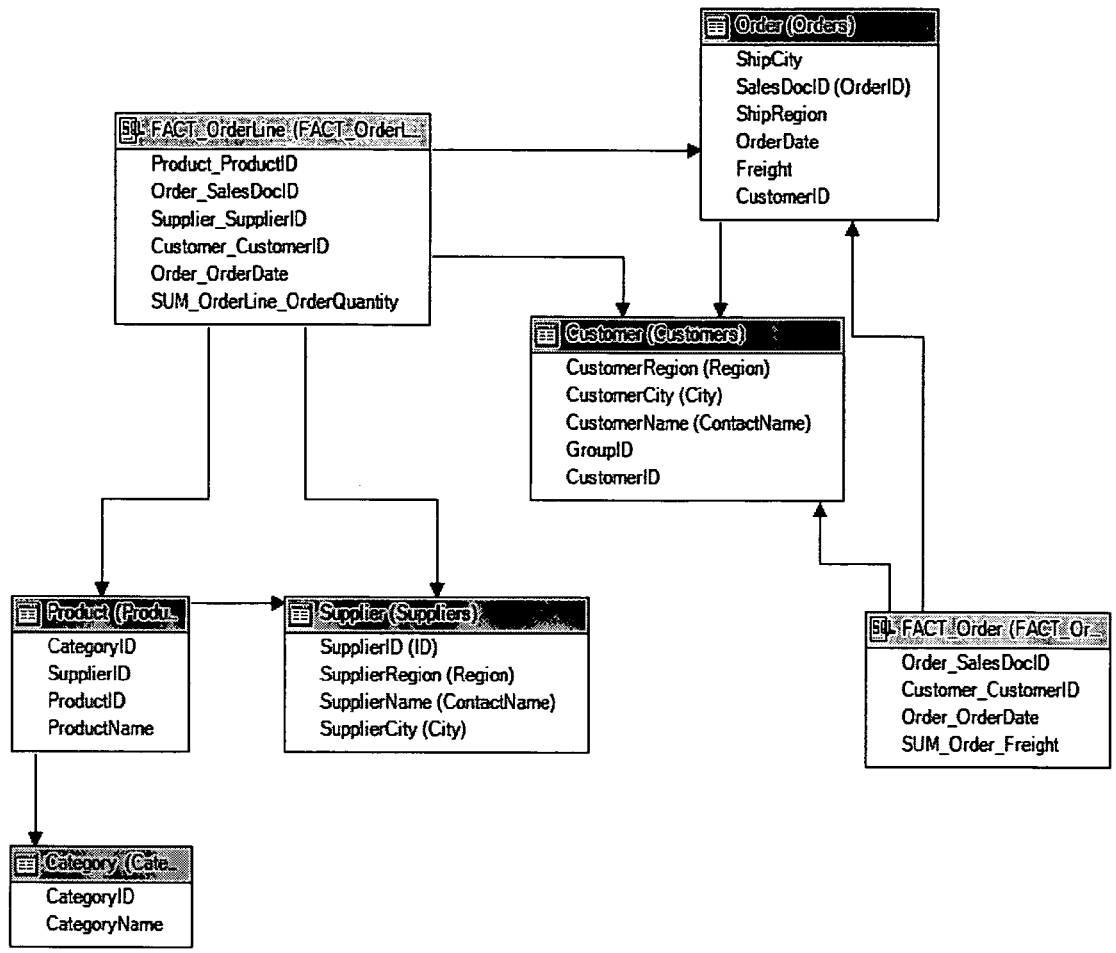
FIG. 20 illustrates a particular dimensional model that is generated based on the UML diagram of FIG. 19.

FIG. 20 illustrates a dimensional model that corresponds to the example object-relational data model, and was illustratively inferred based on the data organized within the described standardized data representation.

As was described herein, a model services engine processes information in the form of a model definition schema in order to generate a corresponding dimensional model. It should be emphasized that, in accordance with one aspect of the present invention, the described model definition schema embodiments are beneficial at least in that they extensible enough to enable the model service engine to support different source models and target models.

Figure 21:
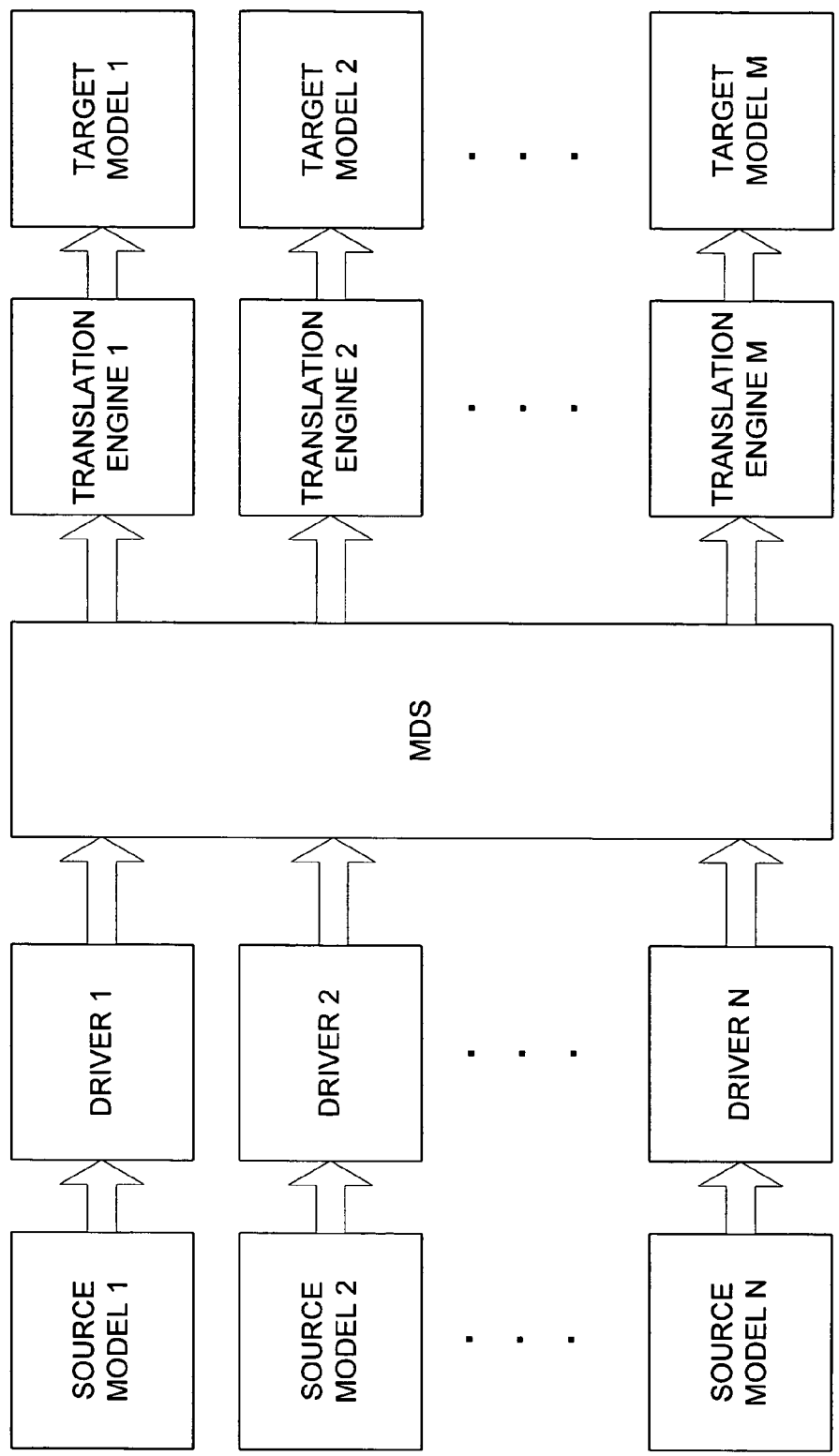
FIG. 21 is a block diagram illustrating an exemplary architecture.

FIG. 21 is a block diagram illustrating an architecture that demonstrates the extensible characteristics of providing the data input in a format consistent with an embodiment of the described model definition schema.

The adoption of a model definition schema (MDS) as a standard to specify an object-relational model allows the challenge of generating a dimensional model to be divided into two separate tasks. First, in accordance with one embodiment, as is illustrated in FIG. 21, a component identified as a "driver" (e.g., driver 1, driver 2, driver n, etc.) is implemented to pre-translate object relational models of a certain type into MDS format. Next, another component identified as a "translation engine" is implemented to generate a dimensional model from the MDS information. Generalizing this architecture, by building different drivers and translation engines around the same MDS, and by mixing and matching them if necessary, different source and target models can also be supported.

The extensibility of the MDS system is exemplified in FIG. 21 by the generation of models 1, 2 and N based on source models 1, 2 and M, respectively. This generalization implies that the complexity of model transformation can be reduced from N (sources)×M(targets) to N+M. Given the described extensibility of the MDS system, any party (e.g., a third party vendor) can implement their own drivers and translation engines to convert one model to the other through the MDS. Accordingly, one can illustratively project transforming a given object model to Oracle OLAP implementation or transforming Siebel to SQL Analysis Service schema.

Although the present invention has been described with reference to particular embodiments, workers skilled in the art will recognize that changes may be made in form and detail without departing from the spirit and scope of the invention.

What is claimed is:

1. A data processing system including a processor, the system comprising:

a standardized data representation that is encoded on a computer-readable storage medium and that represents an object-relational data model;

a model generator that processes the standardized data representation and automatically derives, based on descriptions of objects and an indication of a collection of object-relational mappings in the standardized data representation to generate a dimensional model that corresponds to the object-relational data model, the standardized data representation includes:

a description of the objects and object relationships reflected in the object-relational data model;

a description of persistent data store mappings associated with the object-relational data model;

the indication of a collection of object-relational mappings that specify how a data member associated with a class in the object-relational data model can be filled with data retrieved from at least one table in a relational database;

a description of at least one user-designated focal point that represents a point of analysis indicated in association with data in the object-relational data model; and a description of at least one data element selected from a group consisting of a class from the object-relational data model, a data member associated with a class from the object-relational data model, a collection of object-relational mappings that specify how data is retrieved from a relational database, a field that uniquely identifies a class from the object-relational data model, an association relationship indicator that identifies a relationship among classes in the object-relational data model, a composition relationship indicator that identifies a relationship among classes in the object-relational data model, and a measure that identifies an interesting numerical value used for generation of the dimensional model.

2. The system of claim 1, wherein the standardized data representation is a specification of the object-relational data model decorated with metadata so as to support the derivation of the dimensional model.

3. The system of claim 1, wherein the standardized data representation includes a description of at least one focal point that represents a point of analysis indicated in association with data in the object-relational data model.

4. A data processing system including a processor, the system comprising:

a tagged format data schema that is encoded on a computer-readable storage medium and that represents an object-relational data model;

a model generator that processes the tagged format data schema and automatically derives, based on descriptions of objects and an indication of a collection of object-relational mappings in the tagged format data schema to generate a dimensional model that corresponds to the object-relational data model, the tagged format data schema includes:

a description of objects and object relationships reflected in the object-relational data model;

a description of persistent data store mappings associated with the object-relational data model;

the indication of a collection of object-relational mappings that specify how a data member associated with a class in the object-relational data model can be filled with data retrieved from at least one table in a relational database;

a description of at least one user-designated focal point that represents a point of analysis indicated in association with data in the object-relational data model; and a description of at least one data element selected from a group consisting of a class from the object-relational data model, a data member associated with a class from the object-relational data model, a collection of object-relational mappings that specify how data is retrieved from a relational database, a field that uniquely identifies a class from the object-relational data model, an association relationship indicator that identifies a relationship among classes in the object-relational data model, a composition relationship indicator that identifies a relationship among classes in the object-relational data model, and a measure that identifies an interesting numerical value used for generation of the dimensional model.

5. The system of claim 4, wherein the schema includes a tag used to indicate a class in the object-relational data model.

6. The system of claim 4, wherein the schema includes a tag for indicating a data member associated with a class in the object-relational data model.

7. The system of claim 4, wherein the schema includes a tag for indicating a key field that uniquely identifies a class included in the object-relational data model.

8. The system of claim 4, wherein the schema includes a tag for indicating a name field that uniquely identifies an instance of a class included in the object-relational data model.

9. The system of claim 4, wherein the schema includes a tag for indicating an association relationship among multiple classes in the object-relational data model.

10. The system of claim 4, wherein the schema includes a tag for indicating a composition relationship among multiple classes in the object-relational data model.

11. The system of claim 4, wherein the schema includes a tag for indicating a measure, a measure being an interesting numerical value used for generation of the dimensional model.

12. The system of claim 4, wherein the schema enables the object-relational data model to be specified and decorated with metadata so as to support the derivation of the dimensional model.

13. The system of claim 4, wherein the schema is configured to be processed by a processing engine that is adapted to autonomously derive the dimensional model.

14. The system of claim 4, wherein the schema includes a description of at least one focal point that represents a point of analysis indicated in association with data in the object-relational data model.

15. A data processing system including a processor, the system comprising:

a Extensible Markup Language (XML) data schema that is encoded on a computer-readable storage medium and that represents an object-relational data model;

a model generator that processes the data schema and automatically derives, based on descriptions of objects and an indication of a collection of object-relational mappings in the data schema to generate a dimensional model that corresponds to the object-relational data model, the data schema includes:

a description of objects and object relationships reflected in the object-relational data model;

a description of persistent data store mappings associated with the object-relational data model;

a description of at least one user-designated focal point that represents a point of analysis indicated in association with data in the object-relational data model;

the indication of a collection of object-relational mappings that specify how a data member associated with a class in the object-relational data model can be filled with data retrieved from at least one table in a relational database; and a description of at least one data element selected from a group consisting of a class from the object-relational data model, a data member associated with a class from the object-relational data model, a collection of object-relational mappings that specify how data is retrieved from a relational database, a field that uniquely identifies a class from the object-relational data model, an association relationship indicator that identifies a relationship among classes in the object-relational data model, a composition relationship indicator that identifies a relationship among classes in the object-relational data model, and a measure that identifies an interesting numerical value used for generation of the dimensional model.

16. The system of claim 15, wherein the schema includes a tag used to indicate a class in the object-relational data model.

17. The system of claim 15, wherein the schema includes a tag for indicating a data member associated with a class in the object-relational data model.

18. The system of claim 15, wherein the schema includes a tag for indicating a key field that uniquely identifies a class included in the object-relational data model.

19. The system of claim 15, wherein the schema includes a tag for indicating a name field that uniquely identifies an instance of a class included in the object-relational data model.

20. The system of claim 15, wherein the schema includes a tag for indicating an association relationship among multiple classes in the object-relational data model.

21. The system of claim 15, wherein the schema includes a tag for indicating a composition relationship among multiple classes in the object-relational data model.

22. The system of claim 15, wherein the schema includes a tag for indicating a measure, a measure being an interesting numerical value used for generation of the dimensional model.

23. The system of claim 15, wherein the schema enables the object-relational data model to be specified and decorated with metadata so as to support the derivation of the dimensional model.

* * * * *